(12) United States Patent
Kalayeh

(10) Patent No.: US 7,245,250 B1
(45) Date of Patent: Jul. 17, 2007

(54) SYNTHETIC APERTURE RADAR IMAGE COMPRESSION

(75) Inventor: Hooshmand M. Kalayeh, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 120 days.

(21) Appl. No.: 11/204,892

(22) Filed: Aug. 16, 2005

(51) Int. Cl.
*G01S 13/90* (2006.01)

(52) U.S. Cl. ............... 342/25 R; 342/25 A; 342/25 B; 342/25 D; 342/25 F; 342/192; 342/196; 342/189

(58) Field of Classification Search ............. 342/25 R, 342/25 A, 25 B, 25 C, 25 D, 25 E, 25 F, 342/89, 98–101, 189, 192, 196
See application file for complete search history.

(56) References Cited

U.S. PATENT DOCUMENTS

| | | | |
|---|---|---|---|
| 5,309,522 A | | 5/1994 | Dye |
| 5,659,318 A | * | 8/1997 | Madsen et al. ............ 342/25 C |
| 5,898,399 A | * | 4/1999 | Carrara et al. ............ 342/25 A |
| 5,923,278 A | * | 7/1999 | Poehler et al. ............ 342/25 C |
| 6,011,505 A | * | 1/2000 | Poehler et al. ............ 342/25 C |
| 6,046,695 A | * | 4/2000 | Poehler et al. ............ 342/25 A |
| 6,861,978 B2 | * | 3/2005 | Lam ......................... 342/351 |
| 2003/0142000 A1 | * | 7/2003 | Cho ............................ 342/25 |
| 2003/0222807 A1 | * | 12/2003 | Cho ............................ 342/25 |
| 2004/0004569 A1 | * | 1/2004 | Lam ............................ 342/351 |
| 2004/0017307 A1 | * | 1/2004 | Cirillo et al. .................. 342/25 |
| 2005/0007269 A1 | * | 1/2005 | Carrara et al. ............ 342/25 R |
| 2006/0109165 A1 | * | 5/2006 | Cho ........................... 342/25 R |
| 2007/0040121 A1 | * | 2/2007 | Kalayeh ...................... 250/342 |

FOREIGN PATENT DOCUMENTS

| | | | |
|---|---|---|---|
| DE | 4117849 A1 | * | 12/1992 |
| DE | 4240225 A1 | * | 6/1994 |
| JP | 05126943 A | * | 5/1993 |
| JP | 06118166 A | * | 4/1994 |

OTHER PUBLICATIONS

"Rate allocation for spotlight SAR phase history data compression", Owens, J.W.; Marcellin, M.W. Image Processing, IEEE Transactions on vol. 8, Issue 11, Nov. 1999 pp. 1527-1533.*

(Continued)

*Primary Examiner*—John B. Sotomayor
(74) *Attorney, Agent, or Firm*—RatnerPrestia

(57) ABSTRACT

A method is disclosed of generating multi-resolution images using synthetic aperture radar (SAR) phase history data. A high resolution SAR image may be formed from the phase history data, or a lower resolution SAR image may be formed from a sub-aperture of the phase history data. The multi-resolution images may also be compressed. Compressed multi-resolution images are progressively transmitted to a client until the client receives an image with adequate image quality and/or resolution. Compressed multi-resolution images may also be used for iterative target detection, where images are analyzed by a target detection processor, starting with a lowest resolution image, going to a highest resolution image, until an adequate image of the target or scene is obtained. If a target is not found in the multi-resolution images, a new sub-aperture is chosen on the phase history data, and the target detection process repeats for the new sub-aperture.

29 Claims, 13 Drawing Sheets

OTHER PUBLICATIONS

"High-resolution SAR imaging with angular diversity", Larsson, E.G.; Guoqing Liu; Stoica, P.; Jian Li Aerospace and Electronic Systems, IEEE Transactions on vol. 37, Issue 4, Oct. 2001 pp. 1359-1372.*

"Autofocus image reconstruction from Barcer's phase code modulated ISAR signals", Lazarov, A.D.; Minchev, C. Digital Avionics Systems Conference, 2002. Proceedings. The 21st vol. 2, Oct. 27-31, 2002 pp. 11D3-1-11D3-12.*

Peter J. Burt et al., "The Laplacian Pyramid as a Compact Image Code", IEEE, vol. 31, No. 4, Apr. 1983, pp. 532-540.

Tony Freeman et al., "What is Imaging Radar", pp. 1-6.

"What is Synthetic Aperture Radar", Sandia National Laboratories, pp. 1-3.

A. El Boustani et al., "A Review of Current Raw SAR Data Compression Techiques", pp. 925-930.

Clay Stewart, "Synthetic Aperture Radar Algorithms", CRC Press LLC, 1999.

* cited by examiner

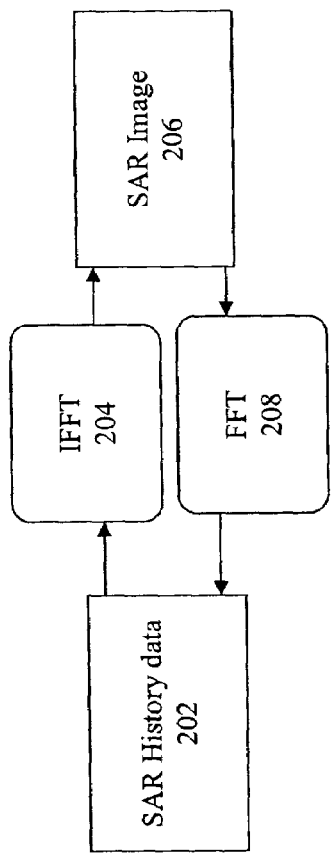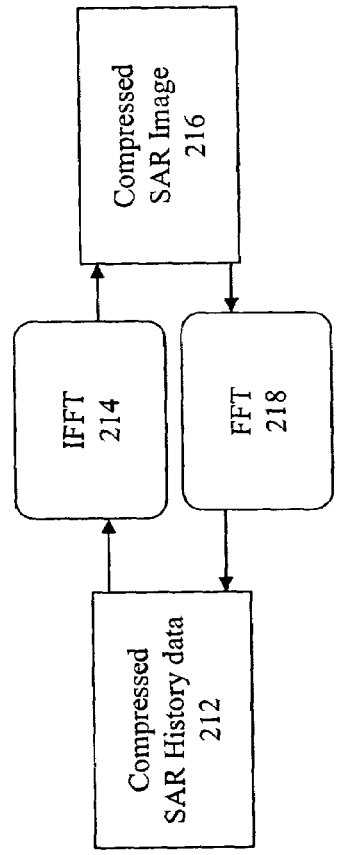

SYNTHETIC APERTURE RADAR IMAGE COMPRESSION

TECHNICAL FIELD

The present invention relates generally to processing data from a synthetic aperture radar (SAR) imaging system and, more particularly, to a system and method for generating compressed, multi-resolution SAR images.

BACKGROUND OF THE INVENTION

Synthetic aperture radar (SAR) is a well known technique for developing radar imagery with excellent two-dimensional (2D) resolution. This is typically done by flying an airplane over the ground to be mapped, and successively transmitting a sequence of radar pulses. With the forward motion of the airplane, each successive radar pulse is transmitted from a position a little further along on the flight path, thus simulating a very long radar array.

Synthetic aperture radar is now a mature technique used to generate radar images in which fine detail can be resolved, and provides unique capabilities as an imaging tool. Because it provides its own illumination (the radar pulses), it can image at any time of day or night, regardless of sunlight illumination. And because the radar wavelengths are much longer than those of visible or infrared light, SAR can also "see" through cloudy and dusty conditions that visible and infrared instruments cannot.

As the radar moves, a pulse is transmitted at each position; the return echoes pass through the receiver and are recorded in an "echo store." Because the radar is moving relative to the ground, the returned echoes are Doppler-shifted (negatively as the radar approaches a target; positively as it moves away). Comparing the Doppler-shifted frequencies to a reference frequency allows many returned signals to be "focused" on a single point, effectively increasing the length of the antenna that is imaging that particular point. This focusing operation, commonly known as SAR processing, is now done digitally on powerful computer systems. SAR processing must correctly match the variation in Doppler frequency for each point in the image, however, and this requires very precise knowledge of the relative motion between the platform and the imaged objects (which is the cause of the Doppler variation in the first place).

Radar energy is transmitted in the form of sequential pulses, at different time instances in the flight path of the vehicle. The pulses interact with the terrain (and any object on the terrain) and a portion of the pulse energy is reflected back towards the platform and recorded by a detector. Returns from different objects arrive at different times at the detector. These time differences provide information on range, which is then used to create a final radar image.

Typically, the transmitted pulses in a SAR system are sinusoidal in nature. The detector records the reflected sinusoids by recording a complex number, whose phase component is directly related to the time-of-flight, or range, and its magnitude component is proportional to the reflected energy. Thus, data captured in a SAR system is complex in nature, with properties that are unique with respect to data captured in systems from other imaging modalities.

FIG. 1 is an exemplary SAR image capture system according to the prior art. In block 10, a pulse generator generates chirps to be emitted from the SAR antenna. Before the chirps are emitted by a transmitter in block 12, however, they are frequency modulated in block 11. A receiver receives chirp echoes (i.e., reflections of the frequency modulated chirps from objects in the area being imaged), and block 13 subsequently performs SAR phase history data preprocessing. The data is then digitized in block 14. Block 15 may then reconstruct the two-dimensional SAR phase history data by performing such steps as pulse compression, Doppler shift corrections, and the like. A two-dimensional (2D) SAR image may then be obtained in block 16 by taking the inverse Fourier transform of the reconstructed phase history data.

Generally, return signals from the transmitted pulses are sampled in the airplane and either processed on board for immediate exploitation or stored or transmitted for processing at another site. The processing is computationally expensive, employing such techniques as FFT, inverse FFT, or correlation on vast amounts of data. These operations require vast processing power and storage. FIG. 2A, for example, illustrates the formation of SAR image 206 by taking the inverse FFT (IFFT) 204 of SAR phase history data 202. Consequently, SAR phase history data 202 may be obtained by taking the FFT 208 of SAR image 206. Furthermore, a compressed SAR image 216 may be obtained by taking the IFFT 214 of compressed SAR phase history data 212, whereby compressed SAR phase history data 212 may be obtained by taking the FFT 218 of compressed SAR image 216. Current methods of SAR phase history data compression are discussed in *A Review of Current Raw SAR Data Compression Techniques* by A. El Boustani et al.

Technology trends in the field of SAR indicate that SAR system designs are continuously pushing the envelope for increases in area coverage and resolution. These trends imply massive amounts of collected data, which in turn, stress the ability to store collected SAR data and rapidly disseminate SAR data. Furthermore, SAR data transmission is undesirably time-consuming for customers who are only interested in a particular target in the scene, as opposed to the entire scene, or customers who aren't interested in a high resolution image of the scene.

SUMMARY OF THE INVENTION

The present invention is embodied in a method of generating multi-resolution synthetic aperture radar (SAR) images. The method includes the steps of: (a) obtaining SAR phase history data, denoted as PH; (b) calculating an inverse Fourier transform of a first data set, denoted as $ph_0$, of the SAR phase history data, PH, to form a highest resolution image, denoted as $G_0$, where $G_0 = FT^{-1}(ph_0)$; (c) calculating the inverse Fourier transform of a plurality of other data sets, denoted as $ph_1 \ldots ph_N$, to form a plurality of correlated lower resolution images, denoted as $G_1 \ldots G_N$, where $G_i = FT^{-1}(ph_i)$, for i=1 to N; (d) subtracting successive ones of the highest resolution image, $G_0$, and the lower resolution images, $G_1 \ldots G_N$, to obtain a plurality of edge enhanced images, denoted as $L_0 \ldots L_{N-1}$, where $L_i = G_i - G_{i+1}$, for i=0 to N−1; and (e) obtaining a lowest resolution image, denoted as $L_N$.

In a further embodiment, the present invention includes a method of generating multi-resolution synthetic aperture radar (SAR) images. The method includes the steps of: (a) obtaining SAR phase history data, denoted as PH; (b) computing an inverse Fourier transform of a first data set, denoted as $ph_0$, of the SAR phase history data, PH, to form a highest resolution image, denoted as $G_0$, where $G_0 = FT^{-1}(ph_0)$; (c) successively low-pass filtering the highest resolution image, $G_0$, to form a plurality of correlated lower resolution images, denoted as $G_1 \ldots G_N$, where $G_{i+1} = LPF(G_i)$, for i=0 to N−1; (d) subtracting successive ones of the highest resolution image, $G_0$, and the lower resolution images, $G_1 \ldots G_N$, to obtain a plurality of edge enhanced images, denoted as $L_0 \ldots L_{N-1}$, where $L_i = G_i - G_{i+1}$, for $i=0$ to $N-1$; and (e) obtaining a lowest resolution image, denoted as $L_N$.

In yet another embodiment, the present invention includes a method of iterative target detection in a synthetic aperture radar (SAR) scene. The method includes (a) obtaining SAR phase history data, denoted as PH, corresponding to the scene; (b) integrating over a plurality of data sets, denoted as $ph_0 \ldots ph_N$, of the phase history data, PH, to obtain a plurality of features, denoted as $F_0 \ldots F_N$; (c) storing the plurality of features, $F_0 \ldots F_N$; (d) performing target detection based on the stored plurality of features to obtain a receiver operating characteristic (ROC) of the scene; (e) determining if the ROC is acceptable; and (f) repeating steps (b)–(e) for a new plurality of other data sets if the ROC is unacceptable. In still another embodiment, the present invention includes a method of progressively transmitting multi-resolution synthetic aperture radar (SAR) images. The method includes the steps of: (a) obtaining SAR phase history data corresponding to a scene; (b) generating a correlated image pyramid including a plurality of multi-resolution images of the scene; (c) generating a Laplacian image pyramid including a plurality of Laplacian images corresponding to a difference of the multi-resolution images in successive levels of the correlated image pyramid; (d) encoding each one of the plurality of Laplacian images; (e) receiving, from a client, a request for a desired image of the scene; and (f) transmitting each one of the plurality of Laplacian images, starting from a bottom level of the Laplacian image pyramid, until the desired image of the scene is transmitted.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 2A is a block diagram of an exemplary SAR image generator, according to the prior art;

FIG. 2B is a block diagram of an exemplary compressed SAR image generator;

DETAILED DESCRIPTION OF THE INVENTION

Figure 1:
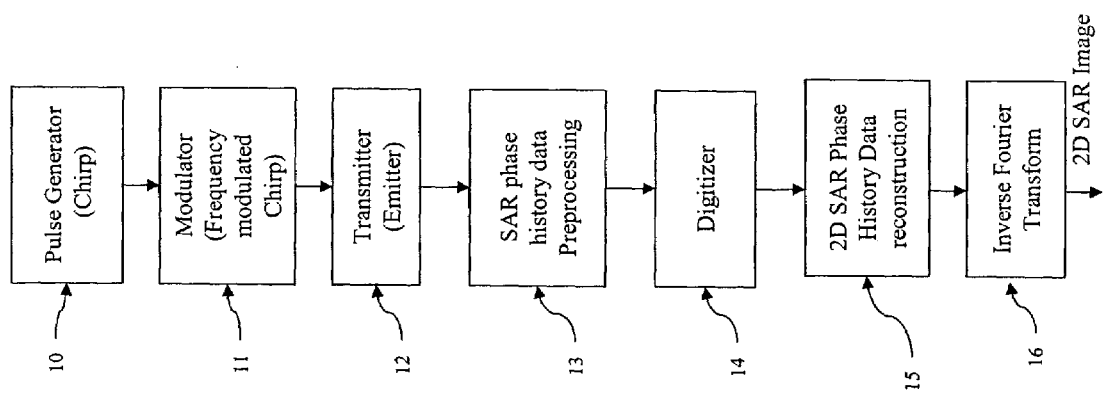
FIG. 1 is a flow diagram of a SAR image acquisition system, according to the prior art.

Airborne and spaceborne based SAR imaging systems are active coherent image acquisition systems and work like flashlight photography. A SAR imaging system emits a microwave frequency-modulated chirp and receives its echo. The collected raw data are then digitally processed to generate 2D SAR phase history data and a SAR image.

More specifically, a SAR system consists of the following subsystems: a pulse generator for generating particular microwave wavelength pulses, an antenna for transmitting the generated pulse to illuminate a region of interest, an antenna for receiving the backscattered returned pulses (i.e., echoes) from target points in the region of interest, a digitizer for converting the received complex analog signal (amplitude and phase) to a digital format, and a signal processor for constructing the SAR 2D phase history data and the SAR image.

SAR signal preprocessing and postprocessing are based on convolution of the SAR emitted beam with the scene and de-convolution of the collected data into a high quality 2D image. To describe the process of constructing the phase history data and forming the SAR image, a few relevant terms are defined, below.

Discrete Fourier Transform (DFT):

$$DFT[h(m,n)] = H(\omega_k, \omega_l) = \sum_{m=0}^{M-1}\sum_{n=0}^{N-1} e^{-i(\omega_k m + \omega_l n)} h(m,n)$$

$$DFT^{-1}[H(\omega_k, \omega_l)] = h(m,n) = \frac{1}{MN}\sum_{k=0}^{M-1}\sum_{l=0}^{N-1} e^{+i(\omega_k m + \omega_l n)} H(\omega_k, \omega_l)$$

Those skilled in the art will recognize that the DFT may be efficiently implemented with the Fast Fourier Transform (FFT).

The convolution of two signals is represented by $f \otimes g$, where:

$$DFT[f \otimes g] = DFT[f] * DFT[g] = F(\omega)G(\omega).$$

The cross-correlation of two signals is represented by $f*g$, where:

$$DFT[f*g] = DFT[\bar{f}] * DFT[g] = \bar{F}(\omega)G(\omega).$$

The multiplication of two signals is represented by $fg$, where:

$$DFT[fg] = DFT[f] \otimes DFT[g] = F(\omega) \otimes G(\omega).$$

Projection theorem states:

$$p_\theta(t) = \sum_m^M \sum_{n=1}^N [h(m,n,t]_\theta$$

$$P_\theta(\omega) = FT[p_\theta(t)] = FT\left\{\sum_m^M \sum_{n=1}^N [h(m,n,t]_\theta\right\}$$

$$P_\theta(\omega) = H(\omega\cos\theta, \omega\sin\theta).$$

In one embodiment of the present invention, the system is a patch of terrain, the input to this system is a chirp modulated on a microwave carrier frequency and the output of the system is the received backscattered 2D phase history data. Let h(m,n) be the impulse response, x(m,n) be the input (i.e., the emitted chirp), and y(m,n) (i.e., the received data) be the output of the system. Accordingly, $y(m,n) = x(m,n) \otimes h(m,n)$, or, in the frequency domain, $Y(u,v) = X(u,v)H(u,v)$, where $Y(u,v) = FFT[y(m,n)]$, $X(u,v) = FFT[x(m,n)]$, and $H(u,v) = FFT[h(m,n)]$.

The impulse response may be computed by $$H(u,v) = \frac{Y(u,v)}{X(u,v)}$$

and then $h(m,n) = FFT^{-1}[H(u,v)]$, noting that x(m,n), h(m,n), and y(m,n) are complex functions.

Also, the SAR system may be characterized by the following parameters: PRF (Pulse Repetition Frequency); RSF (Range Sampling Frequency); k (Chirp slope); $\tau_p$ (Pulse duration); $\lambda$ (Radar wavelength); $\beta$ (Real beam size); D (Real aperture size); $\beta_s$ (Synthetic beam size); $L_s$ (Synthetic aperture size); and v (Platform velocity).

To construct x(m,n) and form y(m,n) from the range time domain and azimuth spatial domain, first the pulse/chirp generated by the pulse generator is mathematically modeled. The generated pulse/chirp is a sinusoidal pulse with a Pulse Repetition Frequency equal to PRF, and may be represented as:

$$x(t) = \left\{\Pi\left(\frac{t}{\tau_a}\right) * \exp(-ikt^2)\right\}, \quad |t| < \frac{\tau_a}{2},$$

where $$\Pi\left(\frac{t}{\tau_a}\right)$$

is the two-dimensional RECT function:

$$\Pi\left(\frac{t}{\tau_a}\right) = \begin{cases} 1, & |t| < \frac{\tau_a}{2} \\ 0. \end{cases}$$

Then the modulated chirp may be modeled as:

$$x(t)\exp(-i\omega_c t) = \Pi\left(\frac{t}{\tau_p}\right)\exp[-(i\omega_c t + kt^2)], \quad |t| < \frac{\tau_p}{2}$$

$$FT[x(t)\exp(-i\omega_c t)] = X(\omega - \omega_c)$$

This modulated chirp is emitted/transmitted by the antenna and subsequently illuminates a target in a region of interest or a terrain patch.

The number of pulses per second, or Pulse Repetition Frequency, is equal to PRF. The number of the samples in range direction (at a given θ), NR, is equal to the Listening Range Echo Time (LRET) multiplied by the Range Sampling Frequency:

NR=LRET*RSF.

The number of the samples in the azimuth direction, NA, is equal to Listening Azimuth Echo Time (LAET) multiplied by the Pulse Repetition Frequency:

$$NA = LAET * PRF = \frac{L_s}{v} PRF_t$$

where v is the sensor velocity and $L_s$ the systematic aperture length.

All the points in the field of the view are illuminated simultaneously while the chirp beam footprint (i.e., the beam spot size) interacts with the target. The terrain surface cover modifies the chirp (e.g., the amplitude, phase, and frequency), whereby the distorted and delayed chirp echoes back toward the antenna (i.e., as a backscattering signal).

The backscattering signal of a target point has an amplitude (i.e., signal strength) and a phase history. Since the SAR antenna is traveling, the echo of each point is received many times, or, in other words, the phase history of each target point is the phase delay of the point, which affects the phase delay of every other point in the field of view. Accordingly, the phase history of a point (k,l) in an M by N array of patch points for a given scene may be given by:

$$y(k,l) = Ae^{-i(nk+ml)}, 0 \leq n \leq N, 0 \leq n \leq N, 0 \leq m \leq M.$$

Each point on the ground is imaged many times as an airborne or spaceborne SAR platform moves along its path while measuring many points on the ground simultaneously.

To clarify, the received signal for an incidence angle/pulse may be modeled by:

$$p_\theta(t) = \sum_{m=0}^{M-1}\sum_{n=0}^{N-1}[h(m,n,t)]_\theta = \sum_{m=0}^{N-1}\sum_{n=0}^{N-1}(A_{(m,n)}e^{i\phi_{(m,n)}(t)})_\theta,$$

where $A_{(m,n)}$ is the surface reflectance of the $(m,n)_{th}$ target point and $\phi_{(m,n)}(t)$ is the phase history delay of the $(m,n)_{th}$ point. The phase history delay is related to the time of an echo return $$\left(\text{i.e., } \frac{2R_\theta}{c}\right).$$

The received data is the convolution of the transmitted pulsed beams and target topographical points, where for one look, for example, a terrain patch is illuminated from many different incidence angles and is, thus, unfocused and must be de-convolved improve its resolution in both cross-track and along-track directions.

The data processing is first done on the range (i.e., cross-track) and then on the azimuth (i.e., along-track) directions.

In general, the received signal is given by:

$$y(t) = x(t)\exp(i\omega_c t) \otimes p_\theta(t)$$

$$y(t) = FT^{-1}[(X(\omega-\omega_c)(P_\theta(\omega))]$$

For demodulation, a low pass filter may be used:

$$\text{LOW\_PASS\_FILTER} = \Pi\left(\frac{\omega}{\omega_c}\right)\begin{cases}1, & |\omega| < \frac{\omega_c}{2} \\ 0\end{cases}$$

such that $$X(\omega) = \left\{\Pi\left(\frac{\omega}{\omega_c}\right) * [X(\omega-\omega_c)]\right\},$$

where $$Y(\omega) = X(\omega)P_\theta(\omega) = X(\omega)H(\omega\cos\theta, \omega\sin\theta).$$

Tables 1–4, below, summarize the mathematical modeling, described above, of the aircraft position and beam incident angle, the transmitted signal, the preprocessed received signal in the time domain, and the Fourier transform of the preprocessed received signal for times $t_0$, $t_1$, $t_2$, and $t_{NA-1}$, respectively.

TABLE 1

| | |
|---|---|
| Aircraft Position and beam incident angle at time $t_0$ | $t_0$<br>$\theta_0 = \theta(t_0)$<br>$AP(t_0)$ |
| Transmitted Signal | $x(t_0)\exp(-i\omega_c t_0) =$<br>$\Pi\left(\frac{t_0}{\tau_p}\right)\exp[-(i\omega_c t_0 + kt_0^2)]$ |

TABLE 1-continued

| | |
|---|---|
| Preprocessed Received Signal (time domain) | $y(t_0) = x(t_0) \otimes p(t_0)$<br>$p(t_0) = \sum_{m=0}^{M-1}\sum_{n=0}^{N-1}[h(m,n,t_0)]$<br>$y(t_0) = \{y(t_{0,0}), y(t_{0,1}), \ldots, y(t_{0,NR-1})\}$<br>$x(t_0) = \{x(t_{0,0}), x(t_{0,1}), \ldots, x(t_{0,NR-1})\}$<br>$p(t_0) = \{p(t_{0,0}), p(t_{0,1}), \ldots, p(t_{0,NR-1})\}$<br>$\Delta t_r = t_{0,i+1} - t_{0,i} = \frac{1}{RSF}$ |
| Fourier Transform | $Y(\omega_0)$<br>$X(\omega_0)$<br>$P(\omega_0)$<br>$H(\omega_0\cos(\theta_0), \omega_0\sin(\theta_0))$ |

TABLE 2

| | |
|---|---|
| Aircraft Position and beam incident angle at time $t_1$ | $t_1$<br>$\Delta t_a = t_1 - t_0$<br>$\Delta t_a = \frac{\Delta x}{v}$<br>$\Delta t_a = \frac{1}{PRF}$<br>$\theta_1 = \theta(t_1)$<br>$AP(t_1)$ |
| Transmitted Signal | $x(t_1)\exp(-i\omega_c t_1) =$<br>$\Pi\left(\frac{t_1}{\tau_p}\right)\exp[-(i\omega_c t_1 + kt_1^2)]$ |
| Preprocessed Received Signal (time domain) | $y(t_1) = x(t_1) \otimes p(t_1)$<br>$p(t_1) = \sum_{m=0}^{M-1}\sum_{n=0}^{N-1}[h(m,n,t_1)]$<br>$y(t_1) = \{y(t_{1,0}), y(t_{1,1}), \ldots, y(t_{1,NR-1})\}$<br>$x(t_1) = \{x(t_{1,0}), x(t_{0,1}), \ldots, x(t_{1,NR-1})\}$<br>$p(t_1) = \{p(t_{1,0}), p(t_{1,1}), \ldots, p(t_{1,NR-1})\}$<br>$\Delta t_r = t_{1,i+1} - t_{1,i} = \frac{1}{RSF}$ |
| Fourier Transform | $Y(\omega_1)$<br>$X(\omega_1)$<br>$P(\omega_1)$<br>$H(\omega_1\cos(\theta_1), \omega_1\sin(\theta_1))$ |

TABLE 3

| | |
|---|---|
| Aircraft Position and beam incident angle at time $t_2$ | $t_2$<br>$\Delta t_a = t_2 - t_1$<br>$\Delta t_a = \frac{\Delta x}{v}$<br>$\Delta t_a = \frac{1}{PRF}$<br>$\theta_2 = \theta(t_2)$<br>$AP(t_2)$ |
| Transmitted Signal | $x(t_2)\exp(-i\omega_c t_2) =$<br>$\Pi\left(\frac{t_2}{\tau_p}\right)\exp[-(i\omega_c t_2 + kt_{21}^2)]$ |
| Preprocessed Received Signal (time domain) | $y(t_2) = x(t_2) \otimes p(t_2)$<br>$p(t_2) = \sum_{m=0}^{M-1}\sum_{n=0}^{N-1}[h(m,n,t_2)]$<br>$y(t_2) = \{y(t_{2,0}), y(t_{2,1}), \ldots, y(t_{2,NR-1})\}$<br>$x(t_2) = \{x(t_{2,0}), x(t_{2,1}), \ldots, x(t_{2,NR-1})\}$<br>$p(t_2) = \{p(t_{2,0}), p(t_{2,1}), \ldots, p(t_{2,NR-1})\}$ |

TABLE 3-continued

| | |
|---|---|
| | $\Delta t_r = t_{2,i+1} - t_{2,i} = \frac{1}{RSF}$ |
| Fourier Transform | $Y(\omega_2)$ |
| | $X(\omega_2)$ |
| | $P(\omega_2)$ |
| | $H(\omega_2 \cos(\theta_2), \omega_2 \sin(\theta_2))$ |

TABLE 4

| | |
|---|---|
| Aircraft Position and beam incident angle at time $t_{NA-1}$ | $t_{NA-1}$ |
| | $\Delta t_a = t_{NA-1} - t_{NA-2}$ |
| | $\Delta t_a = \frac{\Delta x}{v}$ |
| | $\Delta t_a = \frac{1}{PRF}$ |
| | $NA = L_s * FRF$ |
| | $\theta_{NA-1} = \theta(t_{NA-1})$ |
| | $P(t_{NA-1})$ |
| Transmitted Signal | $x(t_{NA-1}) \exp(-i\omega_c t_{NA-1}) =$ |
| | $\Pi\left(\frac{t_{NA-1}}{\tau_p}\right) \exp[-(i\omega_c t_{NA-1} + kt_{NA-1}^2)]$ |
| Preprocessed Received Signal (time domain) | $y(t_{NA-1}) = x(t_{NA-1}) \otimes p(t_{NA-1})$ |
| | $p(t_{NA-1}) = \sum_{m=0}^{M-1} \sum_{n=0}^{N-1} [h(m, n, t_{NA-1}]$ |
| | $y(t_{NA-1}) = \{y(t_{NA-1,0}), y(t_{NA-1,1}), \ldots, y(t_{2,NA-1,NR-1})\}$ |
| | $x(t_{NA-1}) = \{x(t_{NA-1,0}), x(t_{NA-1,1}), \ldots, x(t_{2,NA-1,NR-1})\}$ |
| | $p(t_{NA-1}) = \{p(t_{NA-1,0}), p(t_{NA-1,1}), \ldots, p(t_{2,NA-1,NR-1})\}$ |
| | $\Delta t_r = t_{NA-1,i+1} - t_{NA-1,i} = \frac{1}{RSF}$ |
| Fourier Transform | $Y(\omega_{NA-1})$ |
| | $X(\omega_{NA-1})$ |
| | $P(\omega_{NA-1})$ |
| | $H(\omega_{NA-1} \cos(\theta_{NA-1}), \omega_{NA-1} \sin(\theta_{NA-1}))$ |

Next, the NA polar impulse frequency responses of the target may be computed as:

$$\begin{Bmatrix} H(\omega_0 \cos(\theta_0), \omega_0 \sin(\theta_0)) \\ H(\omega_1 \cos(\theta_1), \omega_1 \sin(\theta_1)) \\ H(\omega_2 \cos(\theta_2), \omega_2 \sin(\theta_2)) \\ \ldots \\ \ldots \\ H(\omega_{NA-1} \cos(\theta_{NA-1}), \omega_{NA-1} \sin(\theta_{NA-1})) \end{Bmatrix},$$

where for each impulse frequency response, $(H(\omega \cos(\theta), \omega \sin(\theta)))$, there are NR polar sample points (frequency domain). Therefore, there are NA×NR sample points of the target polar impulse response in the frequency domain.

Now, 2D Cartesian impulse frequency response of the target impulse response may represented by $H(u,v) = H(\omega_k, \omega_l)$, or, simply, $H(k,l)$, where $0 \leq k \leq NA-1$ and $0 \leq l \leq NA-1$, and may be interpolated from the 2D polar impulse frequency response points:

$$\begin{Bmatrix} H(0, 1), H(0, 2), \ldots H(0, NR-1) \\ H(1, 1), H(1, 2), \ldots H(1, NR-1) \\ \ldots \\ \ldots \\ H(NA, 1), H(NA-1, 2), \ldots H(NA-1, NR-1) \end{Bmatrix} =$$

$$\text{INTERPOLATION} \begin{Bmatrix} H(\omega_0 \cos(\theta_0), \omega_0 \sin(\theta_0)) \\ H(\omega_1 \cos(\theta_1), \omega_1 \sin(\theta_1)) \\ H(\omega_2 \cos(\theta_2), \omega_2 \sin(\theta_2)) \\ \ldots \\ \ldots \\ H(\omega_{NA-1} \cos(\theta_{NA-1}), \omega_{NA-1} \sin(\theta_{NA-1})) \end{Bmatrix}$$

Finally the SAR complex image may be reconstructed by:

$$h(m, n) = FFT^{-1}[H(u, v)]$$

$$h(m, n) = A(m, n) e^{i\phi(m,n)} = h_{real}(m, n) + i h_{img}(m, n)$$

$$A(m, n) = |h(m, n)| = \sqrt{h_{real}^2(m, n) + h_{img}^2(m, n)}$$

$$\phi(m, n) = \arctan \frac{h_{img}(m, n)}{h_{real}(m, n)}$$

Accordingly, the SAR phase history data, H(u,v), may be computed from the reconstructed SAR image, h(m, n), by taking the Fourier transform: H(u,v)=FFT [h(m,n)]. In one embodiment of the invention, only the magnitude of h(m,n) may be retained for display as the SAR image.

Figure 3:
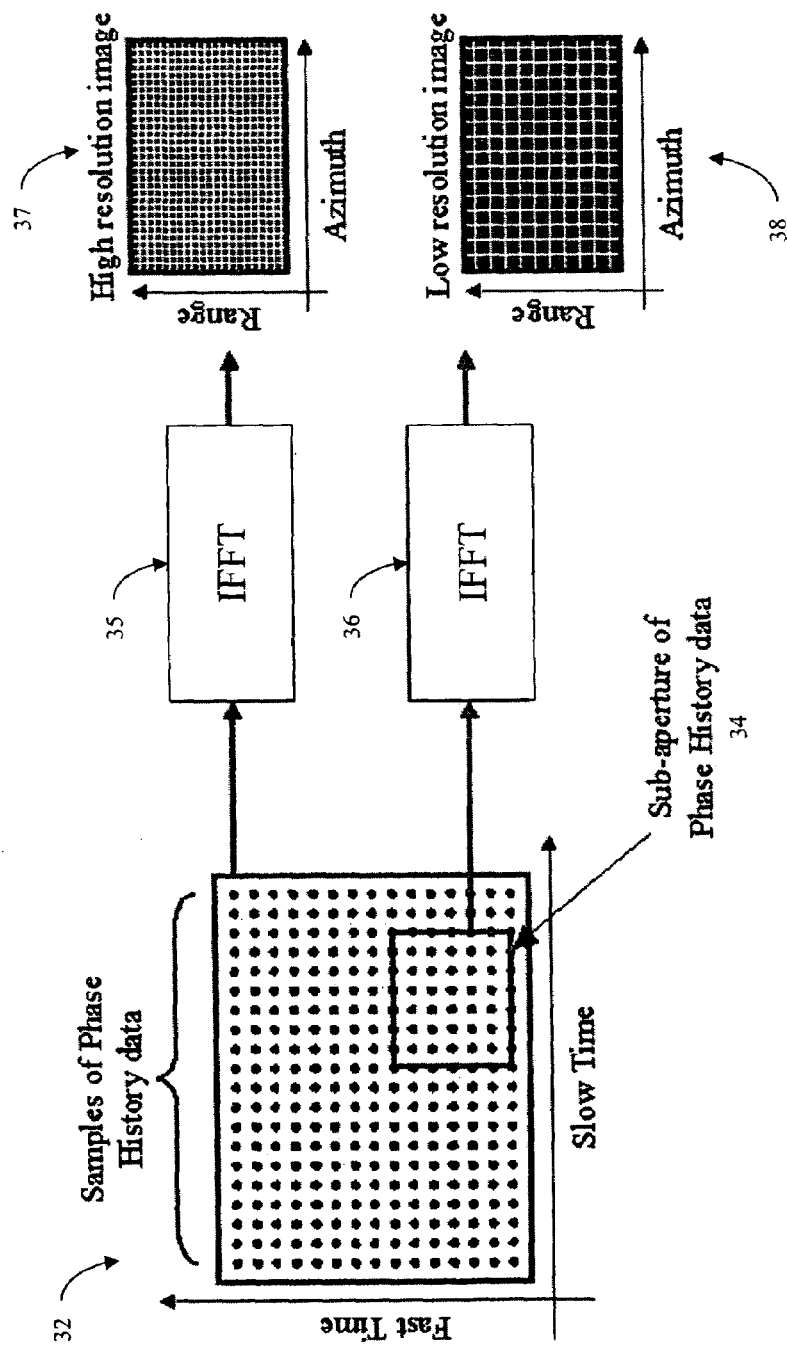
FIG. 3 is a pictorial depicting a comparison between forming a high resolution image using an entire phase history data set and forming a low resolution image from a sub-aperture on the phase history data set.

Referring now to the drawing, in which like reference numbers refer to like elements throughout the various figures that comprise the drawing, FIG. 3 illustrates plot 32 of complex phase history data, where plot 32 includes phase history data, H(u,v), plotted on the slow time (i.e., azimuth, along-track, cross-range) and fast time (i.e., range, cross-track) axes. The entire set of phase history data may be passed to inverse fast Fourier transformer (IFFT) 35 to form high resolution SAR image 37. Alternately, only phase history data in sub-aperture 34 may be passed to IFFT 36 to form low resolution SAR image 38.

Mathematically, taking a sub-aperture of the phase history data corresponds to multiplying the entire phase history data set, H(u,v), by a two-dimensional filter. For a rectangular sub-aperture, for example, this corresponds to multiplying by a 2D RECT function; for a circular sub-aperture, this corresponds to multiplying by a 2D Gaussian distribution.

A 1D box filter, for example, may be represented as:

$$h(x) = RECT\left(\frac{x}{\alpha}\right) = \Pi\left(\frac{x}{\alpha}\right) = \begin{cases} 1, |x| < \frac{\alpha}{2} \\ 0 \end{cases}$$

where taking the Fourier transform gives:

$$FT(h(x)) = F(u) = \alpha \text{ sinc}(\alpha u).$$

A 2D box filter (i.e., a rectangle) may be represented as:

$$g(x, y) = RECT\left(\frac{x}{\alpha}\right)RECT\left(\frac{y}{\beta}\right),$$

where taking the Fourier transform gives:

$$FT(g(x,y))=F(u,v)=\alpha\ \text{sinc}(\alpha u)\beta\ \text{sinc}(\beta v).$$

Figure 4A:
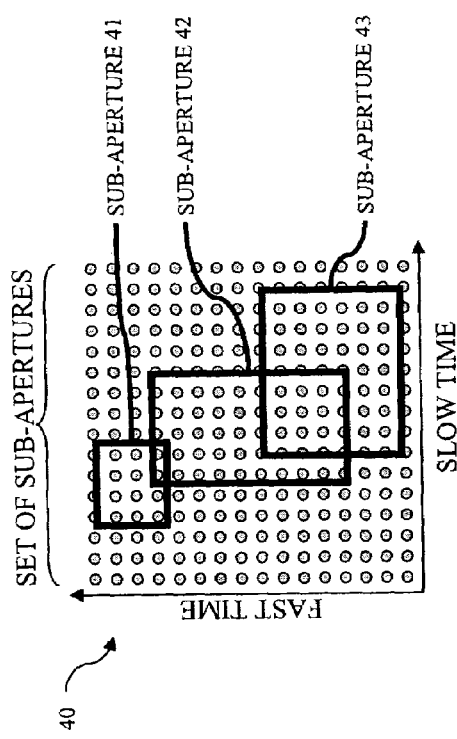
FIG. 4A is a plot of SAR phase history data with exemplary rectangular sub-apertures, according to the present invention.
Figure 4B:
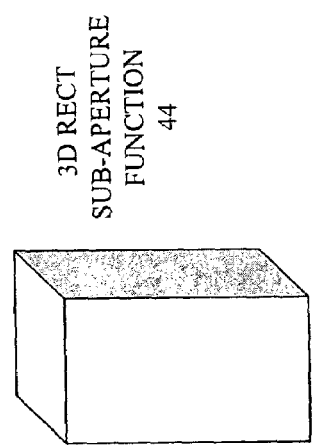
FIG. 4B is a plot of an exemplary three-dimensional RECT sub-aperture function, according to the present invention.

FIG. 4A illustrates a number of sub-apertures, 41–43, that may be taken on the phase history data set 40. Since each data point in the phase history data set 40 is characterized by a slow-time value, a fast-time value, and a magnitude and phase, multiplying the phase history data set 40 by any one of sub-apertures 41–43 corresponds to multiplying by a 2D RECT sub-aperture function, described above, which is a 2D slice of the 3D RECT sub-aperture 44 shown in FIG. 4B.

A 1D Gaussian filter, on the other hand, may be represented as:

$$h(x) = \frac{1}{\sqrt{2\pi}\sigma}e^{-\frac{(x)^2}{2\sigma^2}}$$

where taking the Fourier transform gives:

$$FT[h(x)] = F(u) = e^{-\frac{\sigma^2(u)^2}{2}}.$$

A 2D circularly symmetric Gaussian distribution may be represented as:

$$h(x, y) = \frac{1}{\sqrt{2\pi}\sigma}e^{-\frac{(x)^2}{2\sigma^2}}\frac{1}{\sqrt{2\pi}\sigma}e^{-\frac{(y)^2}{2\sigma^2}}$$

where the Fourier transform gives:

$$F(u, v) = e^{-\frac{\sigma^2(u^2+v^2)}{2}}.$$

A 2D circularly asymmetric Gaussian distribution may be represented as:

$$h(x, y) = \frac{1}{\sqrt{2\pi}\sigma_x}e^{-\frac{(x)^2}{2\sigma_x^2}}\frac{1}{\sqrt{2\pi}\sigma_y}e^{-\frac{(y)^2}{2\sigma_y^2}}$$

where the Fourier transform gives:

$$F(u, v) = e^{-\frac{\sigma_x^2 u^2+\sigma_y^2 v^2}{2}}.$$

Figure 5A:
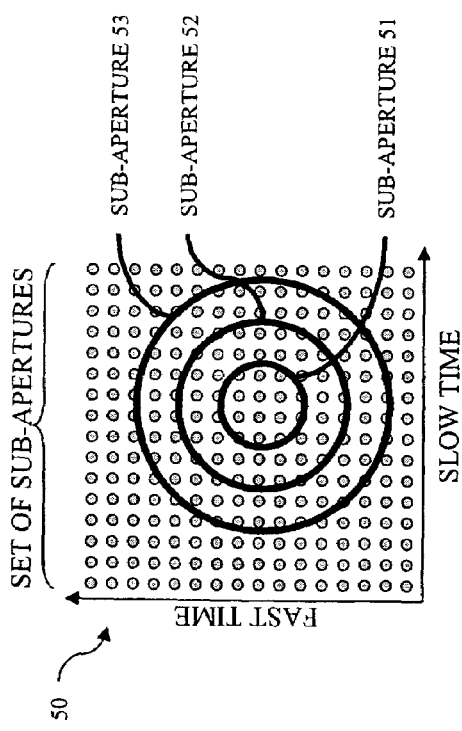
FIG. 5A is a plot of SAR phase history data with exemplary circular sub-apertures, according to the present invention.
Figure 5B:
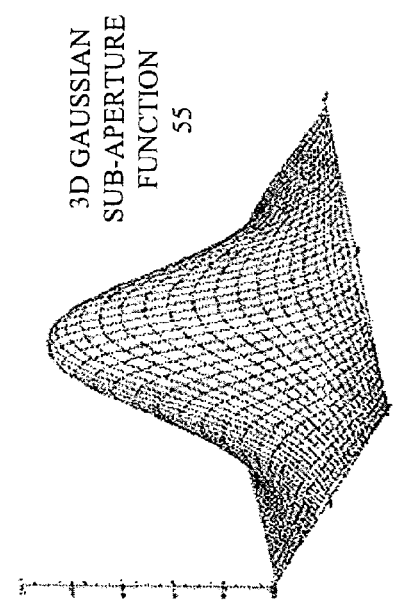
FIG. 5B is a plot of an exemplary three-dimensional Gaussian sub-aperture function, according to the present invention.

FIG. 5A illustrates a number of sub-apertures, 51–53, that may be taken on the phase history data set 50. Since each data point in the phase history data set 50 is characterized by a slow-time value, a fast-time value, and a magnitude and phase, multiplying the phase history data set 50 by any one of sub-apertures 51–53 corresponds to multiplying by a 2D circularly symmetric Gaussian sub-aperture function, described above, which is a 2D slice of the 3D Gaussian sub-aperture 55 shown in FIG. 5B.

Figure 6:
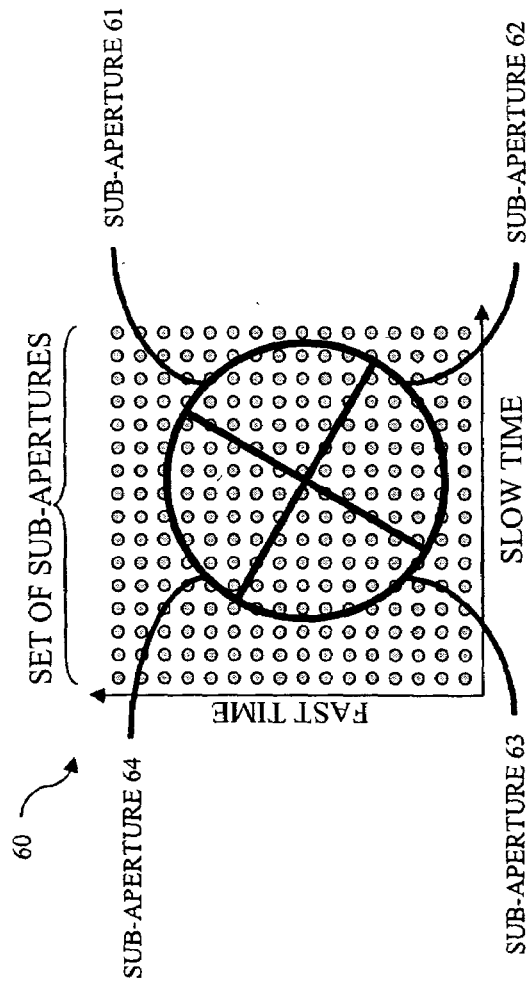
FIG. 6 is a plot of SAR phase history data with exemplary sectoral sub-apertures, according to the present invention.

According to other embodiments of the invention, various other sub-aperture geometries may be used in addition to the rectangular, circularly symmetric, and circularly asymmetric embodiments described above. FIG. 6 illustrates one such exemplary embodiment, where sectoral sub-apertures 61–64, for example, are taken on phase history data set 60.

Those skilled in the art will recognize the following properties of the Fourier Transform with respect to a 1D convolution:

$$g(x)=f(x)\otimes h(x)$$

$$FT(g(x))=FT(f(x))FT(h(x))$$

and with respect to a 2D convolution:

$$g(x,y)=f(x,y)\otimes h(x,y)$$

$$FT(g(x,y))=FT(f(x,y))FT(h(x,y))$$

BY representing a high-quality reconstructed zero-frequency center SAR phase history data as F(u,v), a SAR image may be formed by taking the inverse Fourier transform (f(x,y)=FT$^{-1}$[F(u,v)]) or the inverse Fast Fourier transform (IFFT) (f(x,y)=FFT$^{-1}$[F(u,v)]).

In one embodiment, phase history data F(u,v) is filtered by multiplication with a 2D RECT function representing a rectangular sub-aperture, which corresponds to a convolution of the SAR image with the Fourier transform of the 2D RECT function, as described above. This is shown by:

$$F(u, v)RECT\left(\frac{u}{\alpha}\right)RECT\left(\frac{v}{\beta}\right) \overset{\leftrightarrow}{\rightleftarrows} f(x, y) \otimes [\alpha\text{sinc}(\alpha x)\beta\text{sinc}(\beta y)],$$

where α and β determine the size of a rectangle in the Fourier domain (i.e., the phase history domain).

In another embodiment, phase history data F(u,v) is filtered by multiplication with a 2D circularly symmetric Gaussian function representing a circular sub-aperture, which corresponds to a convolution of the SAR image with the Fourier transform of the 2D circularly symmetric Gaussian function, as described above. This is shown by:

$$F(u, v)e^{-\frac{\sigma^2(u^2+v^2)}{2}} \overset{\leftrightarrow}{\rightleftarrows} f(x, y) \otimes \left[\frac{1}{\sqrt{2\pi}\ \sigma}e^{-\frac{(x)^2}{2\sigma^2}}\frac{1}{\sqrt{2\pi}\ \sigma}e^{-\frac{(y)^2}{2\sigma^2}}\right],$$

where σ determines the size of the circle in the Fourier domain (i.e., the phase history domain).

In yet another embodiment, phase history data F(u,v) is filtered by multiplication with a 2D circularly asymmetric Gaussian function representing an elliptical sub-aperture, which corresponds to a convolution of the SAR image with the Fourier transform of the 2D circularly asymmetric Gaussian function, as described above. This is shown by:

$$F(u, v)e^{-\frac{\sigma_x^2 u^2 + \sigma_y^2 v^2}{2}} \overset{\infty}{\Rightarrow} f(x, y) \otimes \left[ \frac{1}{\sqrt{2\pi}\,\sigma_x} e^{-\frac{(x)^2}{2\sigma_x^2}} \frac{1}{\sqrt{2\pi}\,\sigma_y} e^{-\frac{(y)^2}{2\sigma_y^2}} \right],$$

where $\sigma_x$ and $\sigma_y$ determine the size of the ellipse in the Fourier Domain (i.e., the phase history domain).

Accordingly, an embodiment of the present invention may iteratively filter the phase history data by iteratively multiplying the phase history data, in the Fourier domain, with 2D filter functions corresponding to different sub-apertures. Furthermore, the inverse Fourier transform of the filtered phase history data may be taken after each iteration in order to obtain a multi-resolution SAR image.

For example, a first sub-aperture filtered phase history data set may correspond to $$F(u, v)e^{-\frac{\sigma_1^2(u^2+v^2)}{2}},$$

where the first SAR image may be obtained by taking the inverse Fourier transform:

$$FT^{-1}\left\{ F(u, v)e^{-\frac{\sigma_1^2(u^2+v^2)}{2}} \right\}.$$

In some instances, the first SAR image may not be satisfactory for a number of reasons, which may include, for example, undesirable aliasing effects in the first SAR image that arise as a result of the first sub-aperture selected. Accordingly, a new sub-aperture may be chosen, where the new sub-aperture filtered phase history data set may correspond to $$F(u, v)e^{-\frac{\sigma_2^2(u^2+v^2)}{2}}.$$

The new SAR image, therefore, may be obtained by taking the inverse Fourier transform:

$$F^{-1}\left\{ F(u, v)e^{-\frac{\sigma_2^2(u^2+v^2)}{2}} \right\}.$$

This iterative process may be repeated by changing $\sigma$ until a desirable SAR image is formed from the sub-aperture filtered phase history data set, and/or until a correlated image pyramid is formed for image compression, to be described below. In general:

$$[F_{n+1}(u, v)] = \left\{ [F_n(u, v)]e^{-\frac{\sigma_n^2(u^2+v^2)}{2}} \right\},$$

$$[f_n(x, y)] = FT^{-1}\{F_n(u, v)\}$$

where n is the iteration number.

In an alternate embodiment, the size of the filter is fixed, but the filter may be applied successively. For example, in the first iteration, the phase history data is filtered once:

$$F(u, v)e^{-\frac{\sigma^2(u^2+v^2)}{2}},$$

giving SAR image:

$$FT^{-1}\left\{ F(u, v)e^{-\frac{\sigma^2(u^2+v^2)}{2}} \right\}.$$

In the next iteration, the same filter is applied to the already once-filtered phase history data:

$$\left\{ F(u, v)e^{-\frac{\sigma^2(u^2+v^2)}{2}} \right\} e^{-\frac{\sigma^2(u^2+v^2)}{2}},$$

giving SAR image:

$$FT^{-1}\left\{ F(u, v)e^{-\frac{\sigma^2(u^2+v^2)}{2}} e^{-\frac{\sigma^2(u^2+v^2)}{2}} \right\}.$$

In general:

$$[F_{n+1}(u, v)] = \left\{ [F_n(u, v)]e^{-\frac{\sigma^2(u^2+v^2)}{2}} \right\},$$

$$[f_n(x, y)] = FT^{-1}\{F_n(u, v)\}$$

where n is the iteration number.

Those skilled in the art will recognize that the iteratively generated SAR images, obtained by exemplary embodiments of the invention such as the ones described above, may be spatially correlated in the image domain. In one embodiment of the invention, therefore, obtaining a plurality of correlated SAR images from different sub-apertures may include generating a correlated image pyramid. Accordingly, a Laplacian pyramid technique may be used to compress the plurality of correlated SAR images in the correlated image pyramid. In a further embodiment, target detection and surface or subsurface type classification may be performed by taking the integral of each level in the correlated image pyramid, where each level may correspond to a distinct sub-aperture filtered phase history data set.

In another embodiment, the phase history data may also be iteratively smoothed by: $F_{n+1}(u,v) = \{F_n(u,v) \otimes H(u,v)\}$, where $H(u,v)$ is the Fourier transform of an optimal filter and n is the iteration number. As described above, convolution in one domain corresponds to multiplication in the transform domain, thus $f_{n+1}(x,y) = f_n(x,y)h(x, y)$.

In one embodiment of the invention, a plurality of correlated SAR images may be obtained by iteratively changing a sub-aperture on the phase history data, as described above. In another embodiment of the invention, a plurality of correlated SAR images may be obtained by successively applying a sub-aperture on previously filtered phase history data, as described above. In yet another embodiment, a plurality of correlated SAR images may be obtained by choosing one particular SAR image and then successively downsampling it (e.g., successively convolving the image with a weighting function). Accordingly, the plurality of SAR images that are obtained may be compressed using a Laplacian pyramid, for example, by taking advantage of the correlation between each image in the plurality of images.

In an embodiment of the invention, therefore, successively downsampling a SAR image to form a plurality of SAR images may begin by setting the frame as the entire phase history data set, $ph_0 = F(u,v)$, or, alternately, by choosing a sub-aperture on the phase history data set, $ph_0 = \text{Sub\_Aperture}[F(u,v)]$, where $F(u,v)$ represents the phase history data and choosing a sub-aperture on the phase history data set corresponds to multiplying the phase history data set by a 2D function representing the sub-aperture, as described above. Then, to obtain a lower resolution SAR image for each $i^{th}$ iteration, the higher resolution SAR image from the previous $(i-1)^{th}$ iteration is low-pass filtered to produce the lower resolution SAR image (i.e., $F^{T-1}(ph_i) = \text{LPF}[FT^{-1}(ph_i)]$). This corresponds to convolving the image with a weighting function (such as a Gaussian weighting function, for example) in the spatial domain, or, equivalently, multiplying the image with the weighting function in the frequency domain. Accordingly, a sequence of multi-resolution images $\{FT^{-1}(ph_0), FT^{-1}(ph_1), \ldots, FT^{-1}(ph_n)\}$ are generated, where the image generated by each $i^{th}$ iteration may be a fourth of the size of the image of the previous $(i-1)^{th}$ iteration $$\left(\text{i.e., Size\_of }(ph_i) = \frac{1}{4}\text{Size\_of }(ph_{i-1})\right),$$

depending on the weighting function chosen. Those skilled in the art will recognize that a plurality of different weighting functions such as a Gaussian, triangular, rectangular, trimodal, broad Gaussian, or other weighting function may be chosen without departing from the scope of the present invention.

Figure 7A:
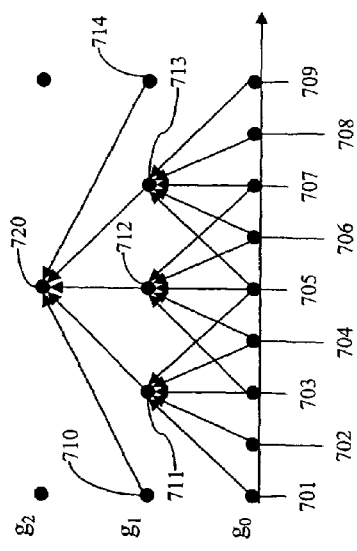
FIG. 7A is a pictorial depicting the formation of a one-dimensional Gaussian pyramid for complex data points, according to the present invention.
Figure 7B:
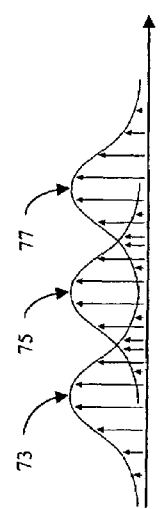
FIG. 7B is a plot of exemplary Gaussian weighting functions for use in obtaining the "$g_1$" level in the one-dimensional Gaussian pyramid of FIG. 11A, according to the present invention.
Figure 7C:
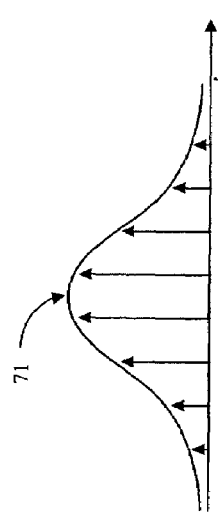
FIG. 7C is a plot of another exemplary Gaussian weighting function for use in obtaining the "$g_2$" level in the one-dimensional Gaussian pyramid of FIG. 11A, according to the present invention.

FIG. 7A is a pictorial illustrating the effect of successively downsampling (i.e., low-pass filtering) a 1D complex image ($g_0$) having complex data points 701–709 in order to obtain lower resolution complex images $g_1$ and $g_2$ in a correlated image pyramid, according to an exemplary embodiment of the present invention. The exemplary embodiment utilizes the exemplary Gaussian weighting functions illustrated in FIGS. 7B and 7C. Gaussian weighting function 73, therefore, is centered on point 703 in image $g_0$, and convolved with image $g_0$ in order to obtain a value for point 710 in image $g_1$ that corresponds to a weighted sum of the values of points 701–705. Gaussian function 75 is centered on point 705 in image $g_0$ and is convolved with image $g_0$ in order to obtain a value for point 711 in image $g_2$ that corresponds to a weighted sum of the values of points 703–707. Gaussian function 77 is centered on point 707 and is convolved with image $g_0$ in order to obtain a value for point 712 in image $g_1$ that corresponds to a weighted sum of the values of points 705–709. To obtain the next lower resolution image, $g_2$, Gaussian function 71 is centered on point 712 in image $g_1$, and convolved with image $g_1$ in order to obtain a value for point 720 in image $g_2$ that corresponds to a weighted sum of the values of points 710–714. Images $g_0$, $g_1$, and $g_2$ are, therefore, correlated. Accordingly, $g_1$ may be subtracted from $g_0$ (giving $L_0$) and $g_2$ may be subtracted from $g_1$ (giving $L_1$) in order to obtain a Laplacian pyramid (i.e., $L_0$, $L_1$, and $g_2$ as $L_2$), which may encoded to provide a compressed representation of 1D images $g_0$, $g_1$, and $g_2$.

In general, by downsampling (i.e., low-pass filtering) the SAR images successively with a low-pass filter, high frequency content (i.e., edges) is removed from the image. As such, a Laplacian pyramid of edge enhanced images may be generated by subtracting the SAR image of each $(i+1)^{th}$ iteration from the SAR image of the previous $i^{th}$ iteration (i.e., $L_i = FT^{-1}(ph_i) - FT^{-1}(ph_{i+1})$). Accordingly, a sequence of Laplacian edge-enhanced images, $L_0, L_1, \ldots, L_n$, may be generated and subsequently encoded to achieve greater data compression, where each $L_i$ is smaller than its predecessor, $L_{i-1}$, by a scale of one half due to reduced image sample density in the horizontal and vertical axes.

Figure 8:
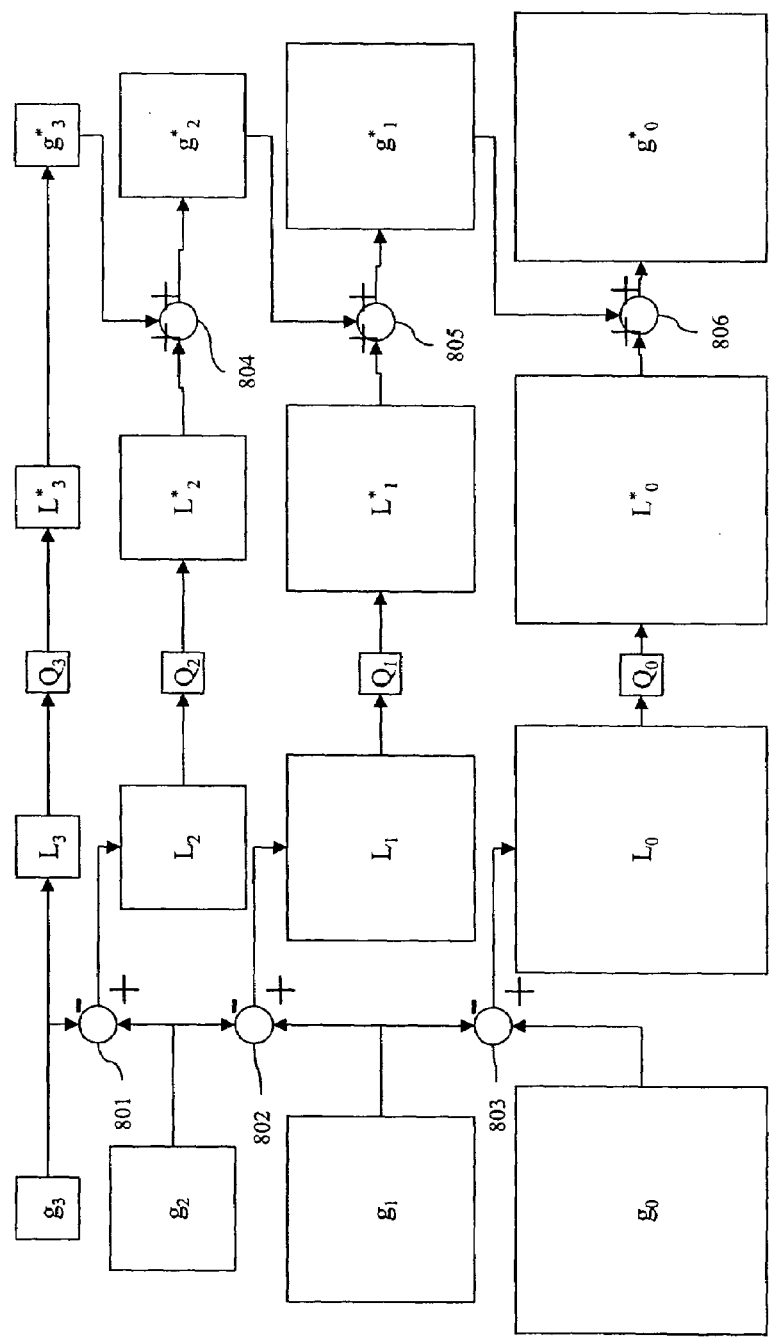
FIG. 8 is a block diagram of an exemplary embodiment of a system for Laplacian pyramid coding and decoding of multi-resolution SAR images, according to the present invention.

FIG. 8 is a block diagram illustrating an exemplary method of obtaining a compressed representation of multi-resolution SAR images $g_0$–$g_3$, according to one embodiment of the present invention. In such an embodiment, it is assumed that multi-resolution SAR images $g_0$–$g_3$ are correlated, thereby constituting a correlated image pyramid. Accordingly, high resolution SAR image $g_0$ may be subtracted by first lower resolution SAR image $g_1$ by subtractor 803 to obtain first Laplacian image $L_0$; first lower resolution SAR image $g_1$ may be subtracted by second lower resolution SAR image $g_2$ by subtractor 802 to obtain second Laplacian image $L_1$; and second lower resolution SAR image $g_2$ may be subtracted by lowest resolution SAR image $g_3$ by subtractor 801 to obtain third Laplacian image $L_2$; and lowest resolution SAR image $g_3$ may be used as fourth Laplacian image $L_3$. Each of Laplacian images $L_0$–$L_3$, constituting a Laplacian image pyramid, may then be encoded as quantized values $Q_0$–$Q_3$, respectively. Quantized values $Q_0$–$Q_3$, therefore, provide a compressed representation of multi-resolution SAR images $g_0$–$g_3$ in the correlated image pyramid. Those skilled in the art will recognize that a greater correlation between respective SAR image levels provides greater compression.

Reconstruction of original SAR images $g_0$–$g_3$ may begin by obtaining quantized value $Q_3$, which is then decoded to obtain a reconstructed fourth Laplacian image $L_3^*$ (which is also equivalent to reconstructed lowest resolution SAR image $g_3^*$). Quantized value $Q_2$ is obtained next and subsequently decoded to obtain reconstructed third Laplacian image $L_2^*$. Reconstructed third Laplacian image $L_2^*$ may then be added to reconstructed lowest resolution SAR image $g_3$ by adder 804 to obtain reconstructed second lower resolution SAR image $g_2^*$. Quantized value $Q_1$ is obtained next and subsequently decoded to obtain reconstructed second Laplacian image $L_1$. Reconstructed second Laplacian image $L_1$ may then be added to reconstructed second lower resolution SAR image $g_2^*$ by adder 805 to obtain reconstructed first lower resolution SAR image $g_1$. Finally, quantized value $Q_0$ is obtained and subsequently decoded to obtain reconstructed first Laplacian image $L_0^*$. Reconstructed first Laplacian image $L_0^*$ may then be added to reconstructed first lower resolution SAR image 91 by adder 806 to obtain reconstructed high resolution SAR image $g_0^*$. Those skilled in the art will recognize the reconstruction steps described above may constitute a progressive transmission of multi-resolution SAR images to a client. Accordingly, such a progressive transmission may stop whenever the client has received a SAR image having an adequate resolution, thereby possibly precluding the need to transmit all of quantized values $Q_0$–$Q_3$.

Those skilled in the art will recognize that many types of encoding schemes may be used to obtain quantized values without departing from the scope of the present invention, including, for example, entropy encoding techniques such as Huffman coding, range encoding, and arithmetic encoding, or static coding techniques such as Unary coding, Elias coding, Fibonacci coding, Golomb coding, or Rice coding.

Figure 9:
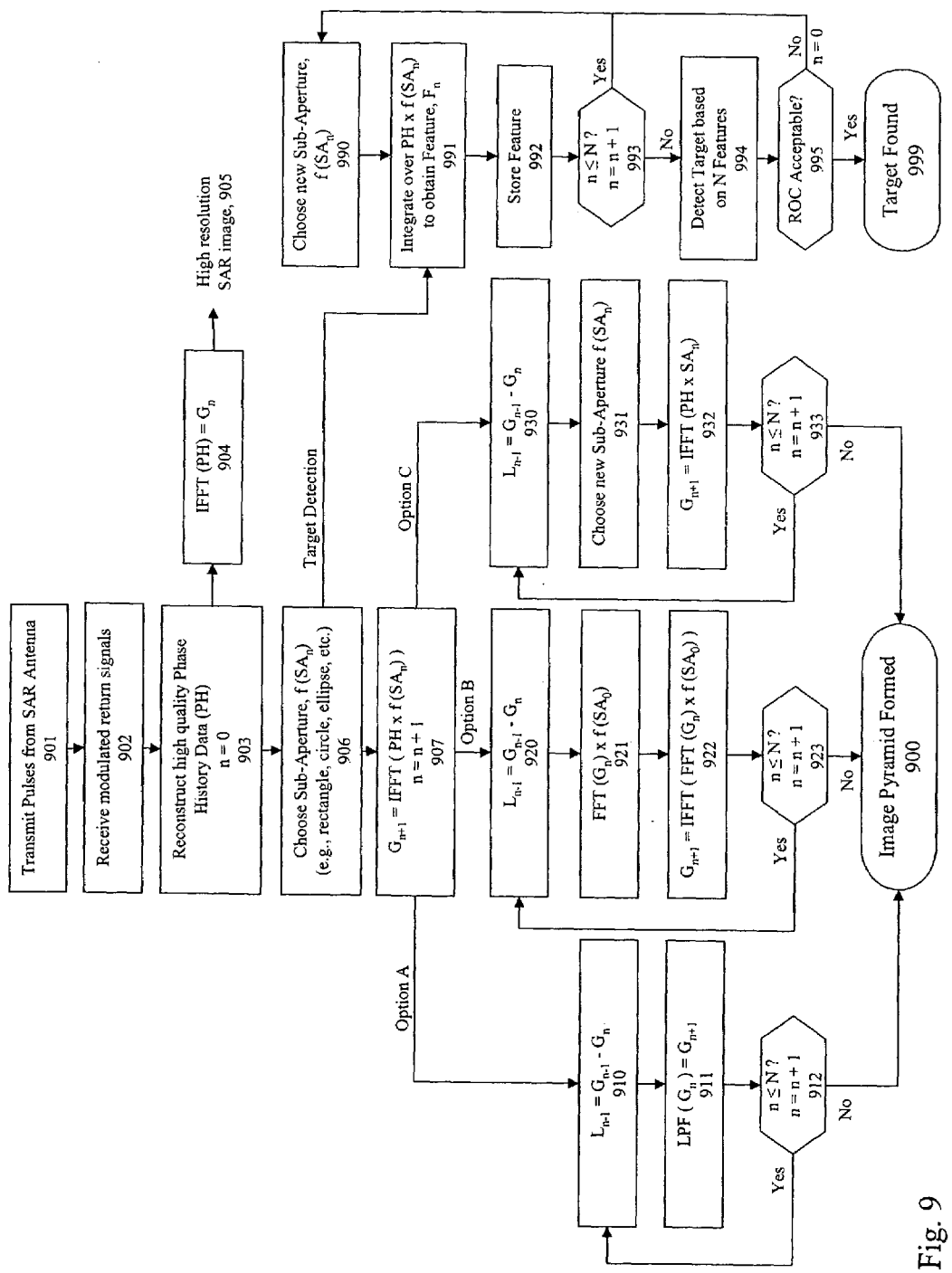
FIG. 9 is a flow diagram illustrating a method of generating compressed multi-resolution SAR images, according to the present invention.

FIG. 9 is a flow diagram illustrating an exemplary method for forming a correlated image pyramid and a corresponding Laplacian pyramid for compression. In step 901, chirps/pulses modulated on a microwave sinusoidal carrier signal are transmitted from the SAR antenna of an airborne or spaceborne SAR imaging system. The chirp/pulses are subsequently reflected back toward the SAR imaging system from objects and terrain in the area being imaged. In step 902, the SAR antenna receives these modulated return signals (i.e., backscattered return pulses). Step 903 subsequently reconstructs a high quality phase history data set from the modulated return signals, as described above, and sets the iteration number, n, to "0". High resolution SAR image 905 (i.e., $G_0$) may then be formed in step 904 by taking the IFFT of the entire phase history data set. Accordingly, in one embodiment (not shown in FIG. 9), high resolution SAR image 905 may be used to obtain a correlated image pyramid by successively downsampling (i.e., low-pass filtering) high resolution SAR image 905 and subtracting successive levels of the image pyramid to form a corresponding Laplacian pyramid, as described above. Alternately, step 906 may proceed to choose a first sub-aperture ($SA_0$) (e.g., rectangle, circle, ellipse, etc.) on the phase history data set, where the first sub-aperture is represented by a 2D function, $f(SA_0)$. Step 907 then obtains the next image in the correlated image pyramid by taking the IFFT of the sub-aperture data set (i.e., by taking the IFFT of the product of the phase history data set and the 2D sub-aperture function, $f(SA_0)$), and then increments the iteration number, n, to "1". The remainder of the correlated image pyramid may be obtained according to a plurality of embodiments of the present invention.

In an embodiment of the invention, the method of forming the correlated image pyramid, described above, may be iteratively repeated if any images in the pyramid have undesirable characteristics. Such undesirable characteristics may include, but are not limited to, image distortion, aliasing, blur, noise, and the like.

In one embodiment, for example, the path labeled "Option A" in FIG. 9 may be taken, where step 910 obtains a first Laplacian image, $L_0$, by subtracting the SAR image of the current iteration, $G_1$, from the SAR image of the previous iteration, $G_0$. In step 911, the SAR image of the current iteration, $G_1$, is downsampled (i.e., low-pass filtered), as previously described, to obtain the SAR image of the next iteration, $G_2$. Step 912 then determines whether the current iteration number, n, is less than or equal to a total number of desired iterations, N, and then increments the current iteration number, n. If n is less than or equal to N, the process moves back to step 910 to form the next Laplacian image, and then to step 911 to form the next SAR image. Accordingly, steps 910–912 are repeated until the correlated image pyramid and corresponding Laplacian pyramid are formed for a desired number of iterations (or levels), N. Once the desired number of iterations are completed, the process ends in step 900.

Figure 10:
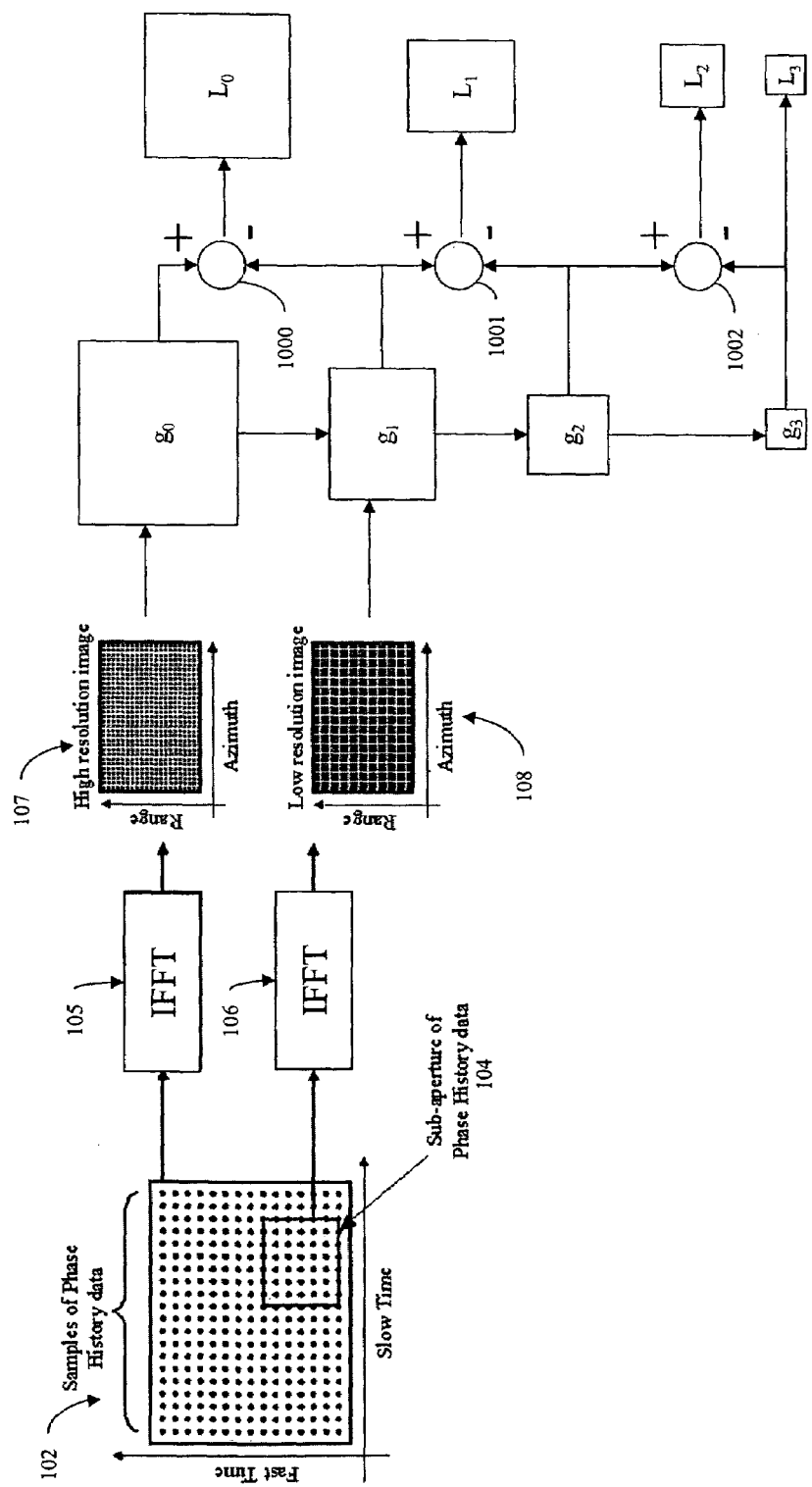
FIG. 10 is a pictorial depicting an exemplary system for generating compressed multi-resolution SAR images from a high resolution image using all the phase history data and a low resolution image from sub-aperture phase history data, according to the present invention.

FIG. 10 illustrates the formation of a correlated image pyramid and corresponding Laplacian pyramid for four iterations (or levels), according to the embodiment of the invention described above with respect to "Option A". Accordingly, entire phase history data set 102 is inverse Fourier transformed by IFFT 105 to obtain high resolution SAR image 107, which corresponds to highest resolution image $g_0$ in the correlated image pyramid. Sub-aperture filtered phase history data set 104 is also inverse Fourier transformed, by IFFT 106, to form first lower resolution SAR image 108, which corresponds to first lower resolution image $g_1$ in the correlated image pyramid. First lower resolution image $g_1$ may then be downsampled (i.e., low-pass filtered), as described above, to obtain second lower resolution image $g_2$. Second lower resolution image $g_2$ may be subsequently downsampled to form lowest resolution image $g_3$. The corresponding Laplacian pyramid may be formed by subtracting $g_1$ from $g_0$ in subtractor 1000 to form first Laplacian image $L_0$, $g_2$ from $g_1$ in subtractor 1001 to form second Laplacian image $L_1$, and $g_3$ from $g_2$ in subtractor 1002 to form third Laplacian image $L_2$. Lowest resolution image $g_3$ may be used as fourth Laplacian image $L_3$. Those skilled in the art will recognize that a sub-aperture of any desirable size and/or shape may be chosen, that the highest resolution image $g_0$ may be taken from any sub-aperture filtered phase history data set, and that any number of iterations may be performed to obtain a desired number of levels of the correlated image pyramid.

In another embodiment, the path labeled "Option B" in FIG. 9 may be taken, where step 920 obtains a first Laplacian image, $L_0$, by subtracting the SAR image of the current iteration, $G_1$, from the SAR image of the previous iteration, $G_0$. In step 921, the SAR image of the current iteration, $G_1$, is convolved with a low-pass filter corresponding to the first sub-aperture. In other words, the phase history data corresponding to the SAR image of the current iteration (i.e., $FFT(G_1)$), is multiplied by the 2D sub-aperture function, $f(SA_0)$. Step 922 obtains the resulting SAR image of the next iteration, $G_2$, by taking the inverse Fourier transform of the twice filtered phase history data set:

$$FT^{-1}\{[PH \cdot f(SA_0)] \cdot f(SA_0)\} = FT^{-1}\{FT(G_1) \cdot f(SA_0)\}.$$

Step 923 then determines whether the current iteration number, n, is less than or equal to a total number of desired iterations, N, and then increments the current iteration number, n. If n is less than or equal to N, the process moves back to step 920 to form the next Laplacian image, and then to steps 921–922 to form the next SAR image. Accordingly, steps 920–922 are repeated until the correlated image pyramid and corresponding Laplacian pyramid are formed for a desired number of iterations (or levels), N. Once the desired number of iterations are completed, the process ends in step 900.

Figure 11:
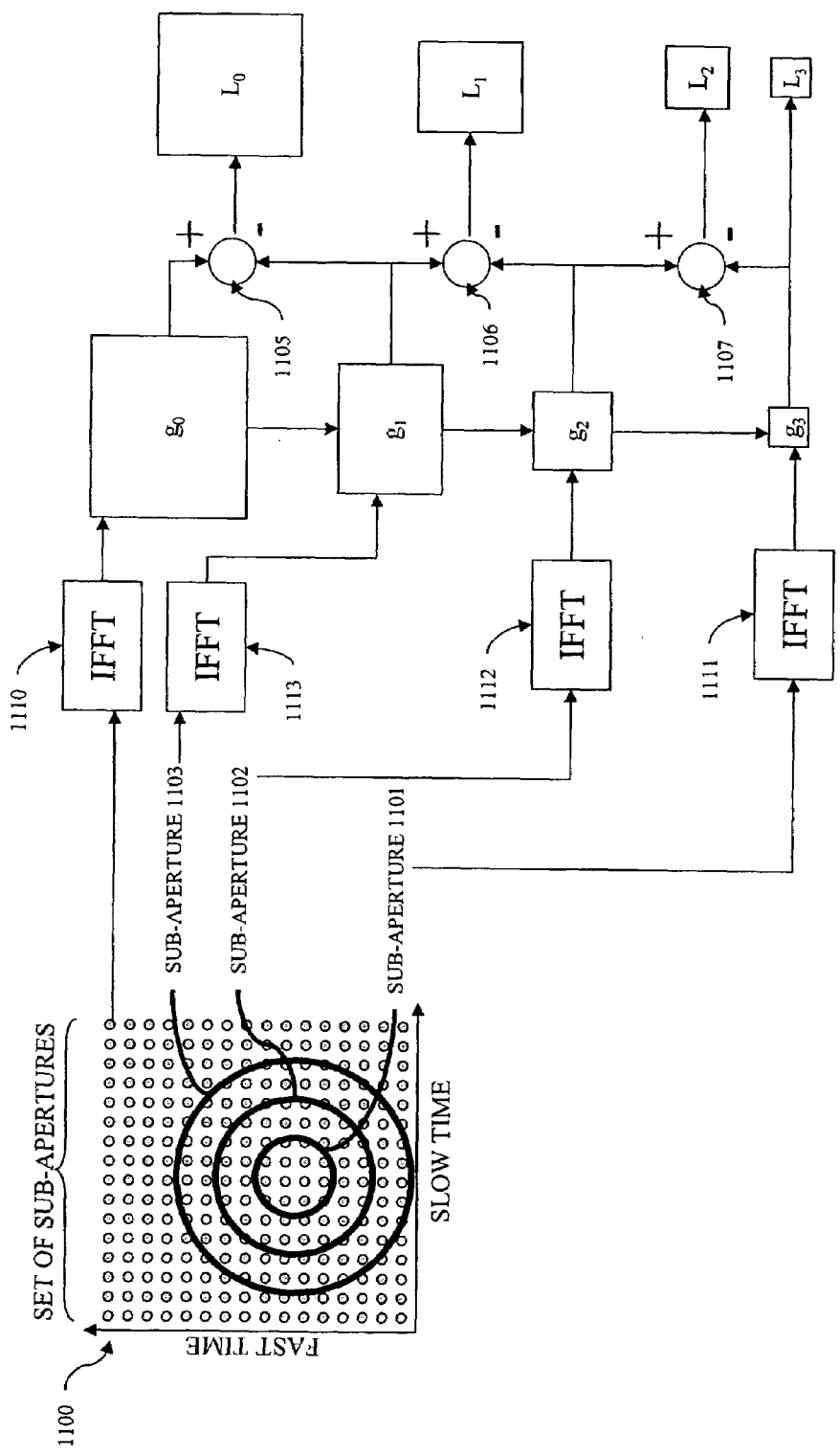
FIG. 11 is a pictorial depicting a system for generating compressed multi-resolution SAR images from circular sub-apertures, according to the present invention.

FIG. 11 illustrates the formation of a correlated image pyramid and corresponding Laplacian pyramid for four iterations (or levels), according to the embodiment of the invention described above with respect to "Option B". Accordingly, phase history data set 1100 is inverse Fourier transformed by IFFT 1110 to obtain highest resolution SAR image $g_0$ in the correlated image pyramid. The first lower resolution SAR image $g_1$ in the correlated image pyramid may be obtained by filtering phase history data set 1100 by a circularly symmetric sub-aperture. Accordingly, sub-aperture data set 1103 is inverse Fourier transformed, by IFFT 1113, to form first lower resolution SAR image $g_1$. The second lower resolution SAR image $g_2$ in the correlated image pyramid may be obtained by filtering sub-aperture data set 1103 by the same circularly symmetric sub-aperture. Accordingly, sub-aperture data set 1102 is inverse Fourier transformed, by IFFT 1112, to form second lower resolution SAR image $g_2$. The lowest resolution SAR image $g_3$ in the correlated image pyramid may be obtained by filtering sub-aperture data set 1102 by the same circularly symmetric sub-aperture. Accordingly, sub-aperture filtered phase history data set 1101 is inverse Fourier transformed, by IFFT 1111, to form lowest resolution SAR image $g_3$.

The corresponding Laplacian pyramid may then be formed by subtracting $g_1$ from $g_0$ in subtractor 1105 to form first Laplacian image $L_0$, $g_2$ from $g_1$ in subtractor 1106 to form second Laplacian image $L_1$, and $g_3$ from $g_2$ in subtractor 1107 to form third Laplacian image $L_2$. Lowest resolution image $g_3$ may be used as fourth Laplacian image $L_3$. Those skilled in the art will recognize that a sub-aperture of any desirable size and/or shape may be chosen, that the highest resolution image $g_0$ may be taken from any sub-aperture filtered phase history data set, and that any number of iterations may be performed to obtain a desired number of levels of the correlated image pyramid.

In yet another exemplary embodiment, the path labeled "Option C" in FIG. 9 may be taken, where step 930 obtains a first Laplacian image, $L_0$, by subtracting the SAR image of the current iteration, $G_1$, from the SAR image of the previous iteration, $G_0$. In step 931, a new sub-aperture ($SA_1$) (e.g., rectangle, circle, ellipse, etc.) on the phase history data set is chosen for the current iteration, where the new sub-aperture is represented by a 2D function, $f(SA_1)$. Step 932 then obtains the next image, $G_2$, in the correlated image pyramid by taking the IFFT of the sub-aperture data set (i.e., by taking the IFFT of the product of the phase history data set and the 2D sub-aperture function, $f(SA_1)$), and then increments the iteration number, n, to "2". Step 933 then determines whether the current iteration number, n, is less than or equal to a total number of desired iterations, N, and then increments the current iteration number, n. If n is less than or equal to N, the process moves back to step 930 to form the next Laplacian image, and then to steps 931–932 to choose a new sub-aperture and form the next SAR image. Accordingly, steps 930–932 are repeated until the correlated image pyramid and corresponding Laplacian pyramid are formed for a desired number of iterations (or levels), N. Once the desired number of iterations are completed, the process ends in step 900.

Figure 12:
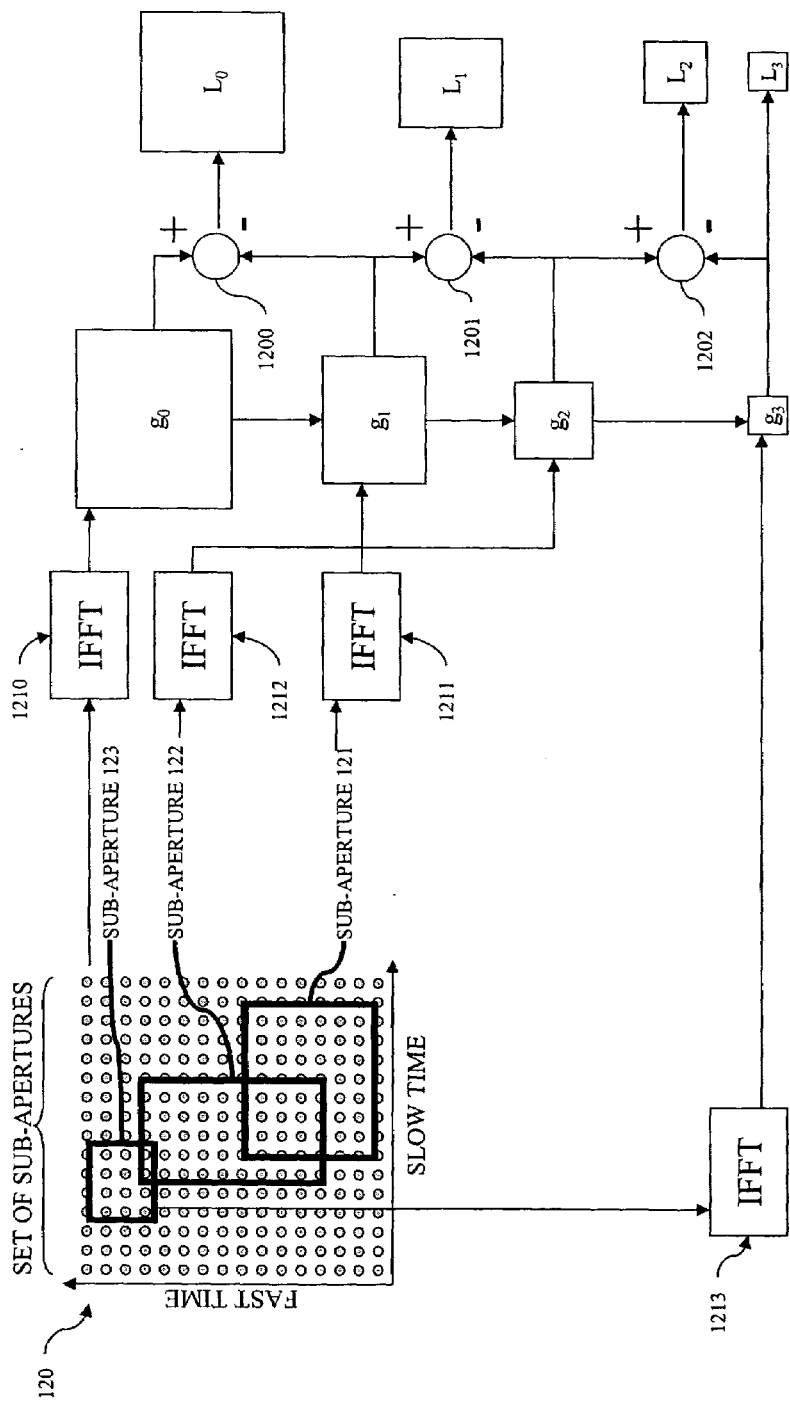
FIG. 12 is a pictorial depicting a system for generating compressed multi-resolution SAR images from rectangular sub-apertures, according to the present invention.

FIG. 12 illustrates the formation of a correlated image pyramid and corresponding Laplacian pyramid for four iterations (or levels), according to the embodiment of the invention described above with respect to "Option C". Accordingly, phase history data set 120 is inverse Fourier transformed by IFFT 1210 to obtain highest resolution SAR image $g_0$ in the correlated image pyramid. The first lower resolution SAR image $g_1$ in the correlated image pyramid may be obtained by filtering phase history data set 120 by a rectangular sub-aperture. Accordingly, sub-aperture data set 121 is inverse Fourier transformed, by IFFT 1211, to form first lower resolution SAR image $g_1$. The second lower resolution SAR image $g_2$ in the correlated image pyramid may be obtained by filtering phase history data set 120 by a new rectangular sub-aperture. Accordingly, sub-aperture data set 122 is inverse Fourier transformed, by IFFT 1212, to form second lower resolution SAR image $g_2$. The lowest resolution SAR image $g_3$ in the correlated image pyramid may be obtained by filtering phase history data set 120 by yet another new rectangular sub-aperture. Accordingly, sub-aperture data set 123 is inverse Fourier transformed, by IFFT 1213, to form lowest resolution SAR image $g_3$.

The corresponding Laplacian pyramid may then be formed by subtracting $g_1$ from $g_0$ in subtractor 1200 to form first Laplacian image $L_0$, $g_2$ from $g_1$ in subtractor 1201 to form second Laplacian image $L_1$, and $g_3$ from $g_2$ in subtractor 1202 to form third Laplacian image $L_2$. Lowest resolution image $g_3$ may be used as fourth Laplacian image $L_3$.

Those skilled in the art will recognize that new sub-apertures of any desirable size and/or shape may be chosen, that the highest resolution image $g_0$ may be taken from any sub-aperture filtered phase history data set, and that any number of iterations may be performed to obtain a desired number of levels of the correlated image pyramid.

In a further embodiment of the present invention, the path labeled "Target Detection" in FIG. 9 may be taken before, after, or in parallel with one or more of the other paths (i.e., "Option A", "Option B", and "Option C"). In step 991, a first sub-aperture filtered data set is formed by multiplying the phase history data set with a function representing the current sub-aperture, $f(SA_0)$. By integrating over the first sub-aperture filtered data set, step 991 obtains a first Feature, $F_0$, which is stored in step 992. Step 993 then determines whether the current iteration number, n, is less than or equal to a total number of desired iterations, N, and then increments the current iteration number, n. If n is less than or equal to N, the process moves to step 990 to choose a new sub-aperture, and then to steps 991–992 to form and store the feature, $F_n$, for the current iteration. Accordingly, steps 990–992 are repeated until the desired number of features, N, are formed and stored. Once the desired number of iterations are completed, the process moves to step 994 to detect a target based on these N stored features. Target detection may include using the N features as input to a supervised (Maximum Likelihood), a Neural Networks or unsupervised classifier such as a K-means or ISODATA clustering method for target, texture, and geometric cover type classifications. If, in step 995, the Receiver Operating Characteristic (ROC) for the current target detection is acceptable, then target detection is completed in step 999. If the ROC is unacceptable, the iteration number, n, is reset and the target detection process restarts from step 990. Accordingly, an embodiment of the present invention provides iterative target detection on a captured scene characterized by phase history data, by iteratively choosing new sub-apertures on the phase history data for forming features to be used in target detection algorithms.

Figure 13:
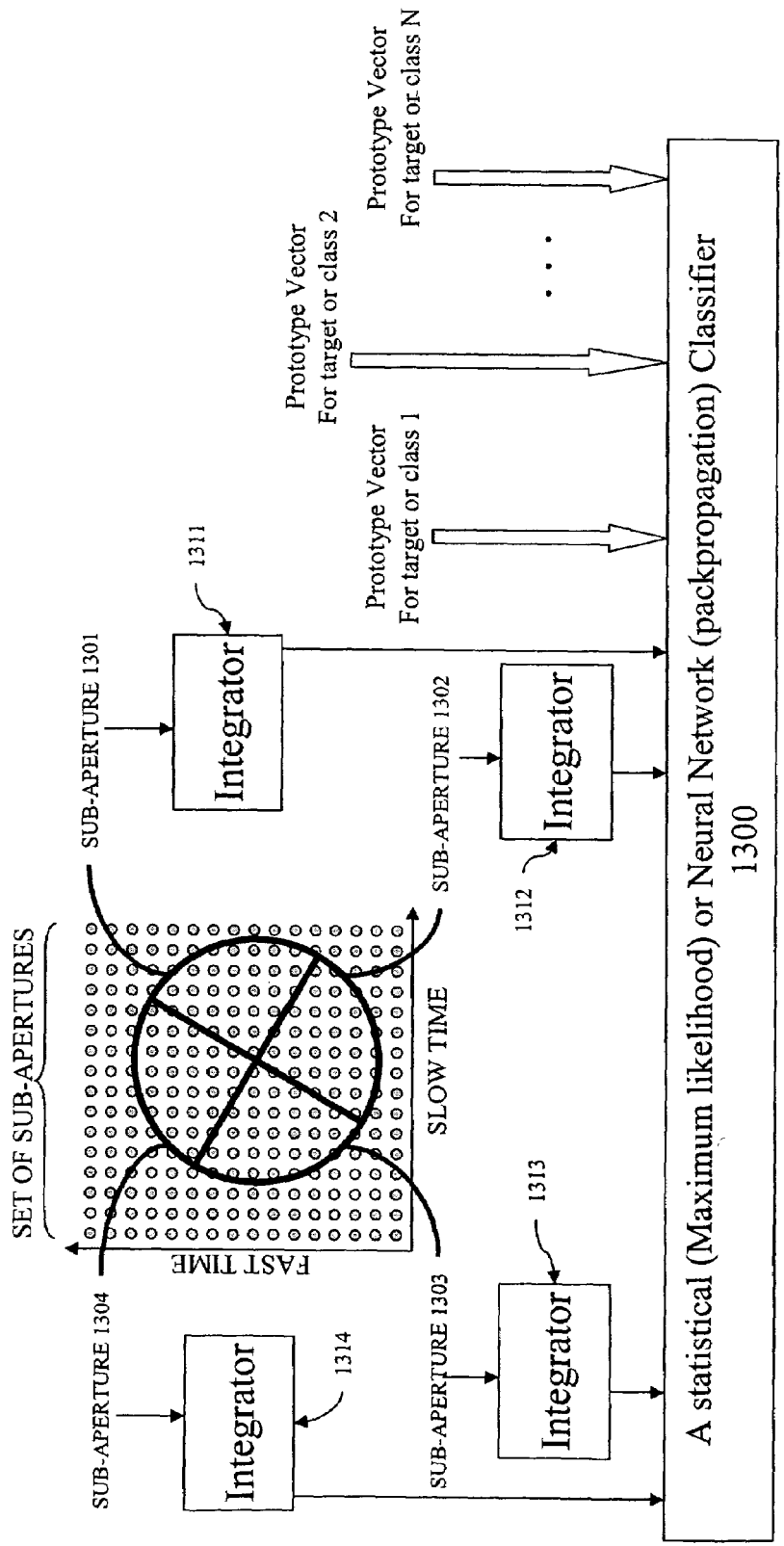
FIG. 13 is a pictorial illustrating an exemplary target detection system using sectoral sub-apertures, according to the present invention.

FIG. 13 illustrates the formation of four features for use in target detection, according to the embodiment of the invention described above with respect to "Target Detection". Accordingly, phase history data within first, second, third, and fourth sectoral sub-apertures 1301–1304 are integrated by integrators 1311–1314, respectively. The resulting four features are inputted to a statistical (maximum likelihood) or neural network (packpropagation) classifier 1300. Other inputs to classifier 1300 include prototype vectors for a plurality of targets or classes (i.e., prototype vector for target or class 1 to N).

Exemplary features may also include annuli and sector masks, where each annuli and sector corresponds to a sub-aperture. Accordingly, in a target detection method according to the present invention, only a few concentric annuli in an upper Fourier half-plane (SAR phase history data) and equal-angle sectors in a lower Fourier half-plane, for selected hyper spectral bands or in an orthogonal sub-space, features may be extracted.

In yet another embodiment of the invention, multi-resolution SAR images may be progressively transmitted to a client that requests a desired image of a scene or one or more targets within the scene. The client may require that the desired image have a desired resolution and be substantially free from undesirable characteristics such as aliasing, noise, blur, and the like, for example. In general, the method may begin by obtaining SAR phase history data corresponding to the scene. A correlated image pyramid may then be generated, as described above, comprising a plurality of multi-resolution images of the scene. A Laplacian pyramid may then be generated, as described above, comprising a plurality of edge-enhanced images corresponding to a difference in the multi-resolution images in successive levels of the correlated image pyramid. Each one of the Laplacian pyramid images may then be encoded for further compression.

A client request for the desired image may be received either before, after, or simultaneous to the steps described above. Once the encoded Laplacian pyramid images are ready, they are successively transmitted to the client, starting from the bottom level of the pyramid (i.e., lowest resolution and smallest size image) and working up the pyramid until the desired image has been sent.

In one embodiment of the invention, a request for a desired image is received from a client, but the characteristics of the desired image are unknown at the time of transmission. Accordingly, the method may continue to transmit the encoded images starting from a bottom level until an indication is received from the client that the desired image has been transmitted. The method may stop sending images once it's received such an indication. In a further embodiment, the method may transmit all the encoded images without receiving an indication that the desired image has been transmitted. This corresponds to a situation where the client is not happy with the characteristics of the images in the correlated image pyramid. In such a case, therefore, a new correlated image pyramid and corresponding encoded Laplacian pyramid may be formed, and the method repeated, until the desired image is transmitted.

In another embodiment, the method may also detect one or more targets in the scene, as described above. Accordingly, correlated image pyramids may be generated as comprising a plurality of multi-resolution images of one or more desired targets, rather than the entire scene. The method may then receive a request from a client for a desired image of a particular target in the scene. The appropriate image pyramid is then selected and the progressive transmissions commenced until the desired image is transmitted.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A method of generating multi-resolution synthetic aperture radar (SAR) images, the method comprising the steps of:
    a) obtaining SAR phase history data, denoted as PH;
    b) calculating an inverse Fourier transform of a first data set, denoted as $ph_0$, of the SAR phase history data, PH, to form a highest resolution image, denoted as $G_0$, where $G_0 = FT^{-1}(ph_0);$ c) calculating the inverse Fourier transform of a plurality of other data sets, denoted as $ph_1 \ldots ph_N$, to form a plurality of correlated lower resolution images, denoted as $G_1 \ldots G_N$, where $G_i = FT^{-1}(ph_i)$, for $i=1$ to $N;$ d) subtracting successive ones of the highest resolution image, $G_0$, and the lower resolution images, $G_1 \ldots G_N$, to obtain a plurality of edge enhanced images, denoted as $L_0 \ldots L_{N-1}$, where $L_i = G_i - G_{i+1}$, for $i=0$ to $N-1$; and e) obtaining a lowest resolution image, denoted as $L_N$.

2. A method according to claim 1, wherein steps (b)–(f) are repeated for a new first data set and a new plurality of other data sets, if one or more of the highest resolution image and the plurality of correlated lower resolution images have undesirable characteristics.

3. A method according to claim 1, further including the step of encoding the plurality of edge enhanced images and the lowest resolution image.

4. The method of claim 3, wherein the encoding step encodes according to one of a Huffman code, a range code, an arithmetic code, a Unary code, an Elias code, a Fibonacci code, a Golomb code, or a Rice code.

5. The method of claim 1, wherein the first data set, $ph_0$, comprises the SAR phase history data, PH:

$ph_0 = PH.$

6. The method of claim 1, wherein the first data set, $ph_0$, comprises a first sub-aperture set, denoted as $SA_0$, of the SAR phase history data, PH, and step (b) further comprises multiplying the SAR phase history data, PH, by a function representing the first sub-aperture set, denoted as $f_{SA0}$, where $ph_0 = PH \cdot f_{SA0}.$ 7. The method of claim 6, wherein the first sub-aperture set, $SA_0$, is chosen from one of a circularly symmetric Gaussian, a circularly asymmetric Gaussian, a rectangle, an annuli, or a sector.

8. A method according to claim 6, further comprising the step of successively multiplying the first data set, $ph_0$, by the function representing the first sub-aperture set, $f_{SA0}$, to obtain the plurality of other data sets, $ph_1 \ldots ph_N$, where $ph_i = ph_0 \cdot (f_{SA0})^{i+1}$, for $i=1$ to $N.$ 9. The method of claim 1, wherein the plurality of other data sets, $ph_1 \ldots ph_N$, comprise a respective plurality of other sub-aperture sets, denoted as $SA_1 \ldots SA_N$, of the SAR phase history data, PH, and step (c) further comprises multiplying the SAR phase history data, PH, by a respective function representing each one of the plurality of other sub-aperture sets:

$ph_i = PH \cdot f_{SAi}$, for $i=1$ to $N.$

10. The method of claim 8, wherein the plurality of other sub-aperture sets, $SA_1 \ldots SA_N$, are chosen from one or more of a circularly symmetric Gaussian, a circularly asymmetric Gaussian, a rectangle, an annuli, and a sector.

11. A method according to claim 1, further comprising the steps of:
    b1) integrating over the first data set, $ph_0$, and each one of the plurality of other data sets, $ph_1 \ldots ph_N$, to obtain a plurality of features, denoted as $F_0 \ldots F_N$;
    b2) storing the plurality of features, $F_0 \ldots F_N$;
    b3) performing target detection based on the stored plurality of features to obtain a receiver operating characteristic (ROC);
    b4) determining if the ROC is acceptable; and
    b5) repeating the method for a new first data set and a new plurality of other data sets if the ROC is unacceptable.

12. The method of claim 11, wherein step (b3) includes inputting the plurality of features to one or more of a statistical, maximum likelihood classifier, and a neural network, packpropagation classifier.

13. The method of claim 12, wherein step (b3) further includes inputting one or more prototype vectors to the classifier(s), each vector corresponding to a respective target or class.

14. The method of claim 11, wherein the first data set, $ph_0$, and the plurality of other data sets, $ph_1 \ldots ph_N$, include a respective plurality of sub-aperture sets, denoted as $SA_0 \ldots SA_N$, of the SAR phase history data, PH, and the method further includes the step of:

choosing the plurality of sub-aperture sets, $SA_0 \ldots SA_N$, from one or more of a circularly symmetric Gaussian, a circularly asymmetric Gaussian, a rectangle, an annuli, and a sector.

15. A method of generating multi-resolution synthetic aperture radar (SAR) images, the method comprising the steps of:

a) obtaining SAR phase history data, denoted as PH;

b) computing an inverse Fourier transform of a first data set, denoted as $ph_0$, of the SAR phase history data, PH, to form a highest resolution image, denoted as $G_0$, where $G_0 = FT^{-1}(ph_0)$;

c) successively low-pass filtering the highest resolution image, $G_0$, to form a plurality of correlated lower resolution images, denoted as $G_1 \ldots G_N$, where $G_{i+1} = LPF(G_i)$, for $i=0$ to $N-1$;

d) subtracting successive ones of the highest resolution image, $G_0$, and the lower resolution images, $G_1 \ldots G_N$, to obtain a plurality of edge enhanced images, denoted as $L_0 \ldots L_{N-1}$, where $L_i = G_i - G_{i+1}$, for $i=0$ to $N-1$; and e) obtaining a lowest resolution image, denoted as $L_N$.

16. The method of claim 15, wherein the step of successively low-pass filtering includes successively convolving the highest resolution image, $G_0$, with a weighting function.

17. The method of claim 16, wherein the weighting function is one of a Gaussian weighting function, a triangular weighting function, a rectangular weighting function, a trimodal weighting function, or a broad Gaussian weighting function.

18. A method according to claim 15, further including the step of encoding the plurality of edge enhanced images and the lowest resolution image.

19. The method of claim 18, wherein the encoding step encodes according to one of a Huffman code, range code, arithmetic code, Unary code, Elias code, Fibonacci code, Golomb code, or Rice code.

20. The method of claim 15, wherein the first data set, $ph_0$, comprises the entire SAR phase history data, PH:

$ph_0 = PH$.

21. The method of claim 15, wherein the first data set, $ph_0$, comprises a first sub-aperture set, denoted as $SA_0$, of the SAR phase history data, PH, and step (b) further includes multiplying the SAR phase history data, PH, by a function representing the first sub-aperture set, denoted as $f_{SA0}$, where $ph_0 = PH \cdot f_{SA0}$.

22. The method of claim 21, wherein the first sub-aperture set, $SA_0$, is chosen from one of a circularly symmetric Gaussian, a circularly asymmetric Gaussian, a rectangle, an annuli, or a sector.

23. A method of iterative target detection in a synthetic aperture radar (SAR) scene, the method comprising the steps of:

a) obtaining SAR phase history data, denoted as PH, corresponding to the scene;

b) integrating over a plurality of data sets, denoted as $ph_0 \ldots ph_N$, of the phase history data, PH, to obtain a plurality of features, denoted as $F_0 \ldots F_N$;

c) storing the plurality of features, $F_0 \ldots F_N$;

d) performing target detection based on the stored plurality of features to obtain a receiver operating characteristic (ROC) of the scene;

e) determining if the ROC is acceptable; and f) repeating steps (b)–(e) for a new plurality of other data sets if the ROC is unacceptable.

24. The method of claim 23, wherein step (b3) includes inputting the plurality of features to one or more of a statistical, maximum likelihood classifier, and a neural network, packpropagation classifier.

25. The method of claim 24, wherein step (b3) further includes inputting one or more prototype vectors to the classifier(s), each vector corresponding to a respective target or class.

26. The method of claim 23, wherein the first data set, $ph_0$, and the plurality of other data sets, $ph_1 \ldots ph_N$, include a respective plurality of sub-aperture sets, denoted as $SA_0 \ldots SA_N$, of the SAR phase history data, PH, and the method further includes the step of:

choosing the plurality of sub-aperture sets, $SA_0 \ldots SA_N$, from one or more of a circularly symmetric Gaussian, a circularly asymmetric Gaussian, a rectangle, an annuli, and a sector.

27. A method of progressively transmitting multi-resolution synthetic aperture radar (SAR) images, the method comprising the steps of:

a) obtaining SAR phase history data corresponding to a scene;

b) generating a correlated image pyramid including a plurality of multi-resolution images of the scene;

c) generating a Laplacian image pyramid including a plurality of Laplacian images corresponding to a difference of the multi-resolution images in successive levels of the correlated image pyramid;

d) encoding each one of the plurality of Laplacian images;

e) receiving, from a client, a request for a desired image of the scene;

f) transmitting each one of the plurality of Laplacian images, starting from a bottom level of the Laplacian image pyramid, until the desired image of the scene is transmitted.

28. A method according to claim 27, further including the steps of:

receiving an indication that the desired image of the scene has been transmitted, wherein step (f) stops transmitting once it receives the indication; and repeating steps (b)–(f) for a new correlated image pyramid if the indication is not received.

29. A method according to claim 27, further comprising the step of detecting one or more targets in the scene, wherein:

step (b) generates the correlated image pyramid comprising a multi-resolution images of the one or more targets;

step (e) receives a request for a desired image of a desired target of the one or more targets; and step (f) transmits until the desired image of the desired target is transmitted.

* * * * *